(12) United States Patent
Curley et al.

(10) Patent No.: US 10,056,636 B1
(45) Date of Patent: *Aug. 21, 2018

(54) ELECTROLYTE COMPOSITIONS FOR USE IN A METAL-HALOGEN FLOW BATTERY

(71) Applicant: PRIMUS POWER CORPORATION, Hayward, CA (US)

(72) Inventors: John Curley, San Francisco, CA (US); Gerardo Jose la O', Alameda, CA (US); Nicholas Williams, San Fransico, CA (US); Kevin Cheung, San Francisco, CA (US); Hooman Hafezi, Redwood City, CA (US)

(73) Assignee: PRIMUS POWER CORPORATION, Hayward, CA (US)

(*) Notice: Subject to any disclaimer, the term of this patent is extended or adjusted under 35 U.S.C. 154(b) by 483 days.

This patent is subject to a terminal disclaimer.

(21) Appl. No.: 14/506,008

(22) Filed: Oct. 3, 2014

Related U.S. Application Data

(60) Provisional application No. 61/886,377, filed on Oct. 3, 2013.

(51) Int. Cl.
H01M 8/18 (2006.01)
H01M 8/08 (2016.01)
H01M 8/20 (2006.01)

(52) U.S. Cl.
CPC ............ *H01M 8/08* (2013.01); *H01M 8/188* (2013.01); *H01M 8/20* (2013.01); *H01M 2250/10* (2013.01); *H01M 2300/0002* (2013.01)

(58) Field of Classification Search
CPC .......... H01M 8/08; H01M 8/188; H01M 8/20; H01M 2250/10; H01M 2300/0002

USPC ......................................................... 429/462
See application file for complete search history.

(56) References Cited

U.S. PATENT DOCUMENTS

| 3,640,770 A | 2/1972 | Zito, Jr. |
| 3,660,170 A | 5/1972 | Rampel |
| 3,713,888 A | 1/1973 | Symons |
| 3,785,868 A | 1/1974 | Devitt |
| 3,811,946 A | 5/1974 | Creutz et al. |
| 3,993,502 A | 11/1976 | Bjorkman, Jr. |
| 4,001,036 A | 1/1977 | Berman et al. |
| 4,072,540 A | 2/1978 | Symons et al. |
| 4,146,680 A | 3/1979 | Carr et al. |

(Continued)

FOREIGN PATENT DOCUMENTS

| JP | 58007773 A | 1/1983 |
| JP | 04242080 A | 8/1992 |

(Continued)

OTHER PUBLICATIONS

Bass "Methods for the reduction of shape change and dendritic growth in zinc-based secondary cells," Journal of Power Sources 35 (1991) 333-351.*

(Continued)

*Primary Examiner* — Jonathan Jelsma
*Assistant Examiner* — Rashid Alam
(74) *Attorney, Agent, or Firm* — The Marbury Law Group PLLC

(57) ABSTRACT

A metal-halogen flow battery system includes an electrolyte composition that includes an aqueous solution including a metal halide, a halogen, a metal plating enhancer and at least one of an anti-dendrite agent, and an anti-corrosion agent.

20 Claims, 23 Drawing Sheets

(56) References Cited

U.S. PATENT DOCUMENTS

| | | | |
|---|---|---|---|
| 4,181,777 A | 1/1980 | Spaziante et al. | |
| 4,306,003 A | 12/1981 | Henriksen | |
| 4,307,159 A | 12/1981 | Hammond et al. | |
| 4,414,292 A | 11/1983 | Kiwalle et al. | |
| 4,473,625 A | 9/1984 | Watakabe et al. | |
| 4,479,856 A | 10/1984 | Ando | |
| 4,510,218 A * | 4/1985 | Ando | H01M 10/365 |
| | | | 429/101 |
| 4,518,663 A | 5/1985 | Kodali et al. | |
| 7,232,513 B1 * | 6/2007 | Webb | C25D 3/38 |
| | | | 205/123 |
| 7,560,189 B2 * | 7/2009 | Clarke | H01M 4/368 |
| | | | 429/105 |
| 8,039,161 B2 | 10/2011 | Winter | |
| 8,114,541 B2 | 2/2012 | Winter | |
| 8,268,480 B1 | 9/2012 | Winter | |
| 8,795,836 B2 * | 8/2014 | Kaylo | C09D 5/44 |
| | | | 205/118 |
| 2006/0257744 A1 | 11/2006 | Burchardt | |
| 2010/0009243 A1 | 1/2010 | Winter | |
| 2010/0021805 A1 * | 1/2010 | Winter | H01M 12/085 |
| | | | 429/101 |
| 2011/0233065 A1 * | 9/2011 | Konigshofen | C25D 3/02 |
| | | | 205/241 |
| 2011/0253553 A1 * | 10/2011 | Bergstein Freiberg | H01M 10/365 |
| | | | 205/619 |
| 2012/0021303 A1 * | 1/2012 | Amendola | H01M 4/42 |
| | | | 429/406 |
| 2012/0028096 A9 | 2/2012 | Winter | |
| 2013/0256145 A1 * | 10/2013 | Romer | C25D 3/60 |
| | | | 205/253 |

FOREIGN PATENT DOCUMENTS

| | | | |
|---|---|---|---|
| WO | WO2008089205 A2 | 7/2008 | |
| WO | WO 2013168145 A1 * | 11/2013 | H01M 12/085 |
| WO | WO2013168145 A1 | 11/2013 | |

OTHER PUBLICATIONS http://www.chemguard.com/pdf/specialty-chemicals/datasheets/S-550%20TDS%2011-21-09.pdf accessed Jan. 24, 2017 with a publication date: Nov. 24, 2009.*

Symons, Philip C., "Advanced Technology Zinc/Chlorine Batteries for Electric Utility Load Leveling," $19^{th}$ Intersociety Energy Conversion Engineering Conf., 1984, vol. 2, 857-862.

EPRI Report, EM-1051 (parts 1-3), Apr. 1979, Electric Power Research Institute.

Silvestru, Cristian, Hans Joachim Breunig, and Henrik Althaus. "Structural chemistry of bismuth compounds. I. Organobismuth derivatives." *Chemical reviews* 99, No. 11 (1999): 3277-3328.

Larsson, Annika, "Evaluation of Flow Battery Technology: An Assessment of Technical and Economic Feasibility," MIT Thesis, 2009, http://hdl.handle.net/1721.1/54555, 4pgs.

* cited by examiner

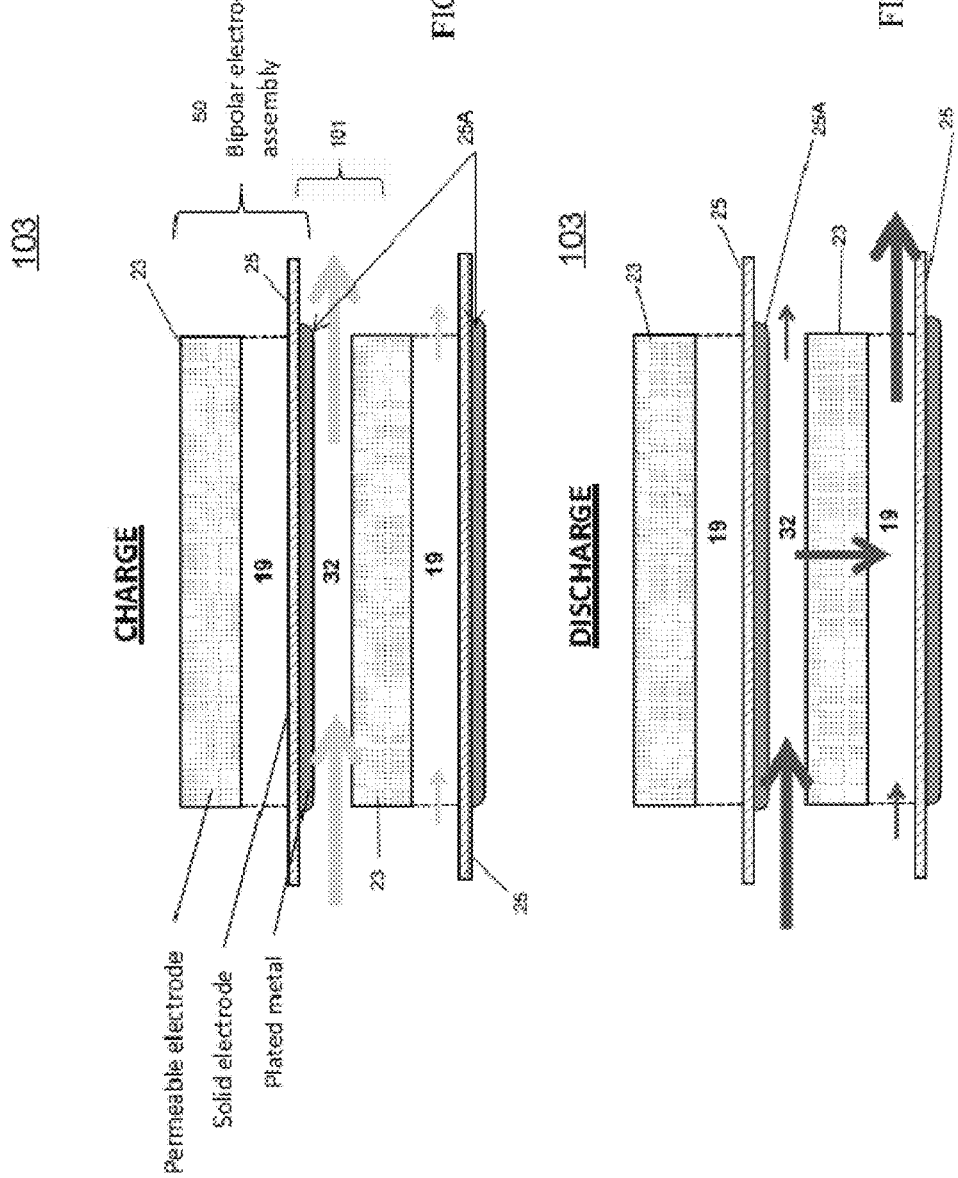

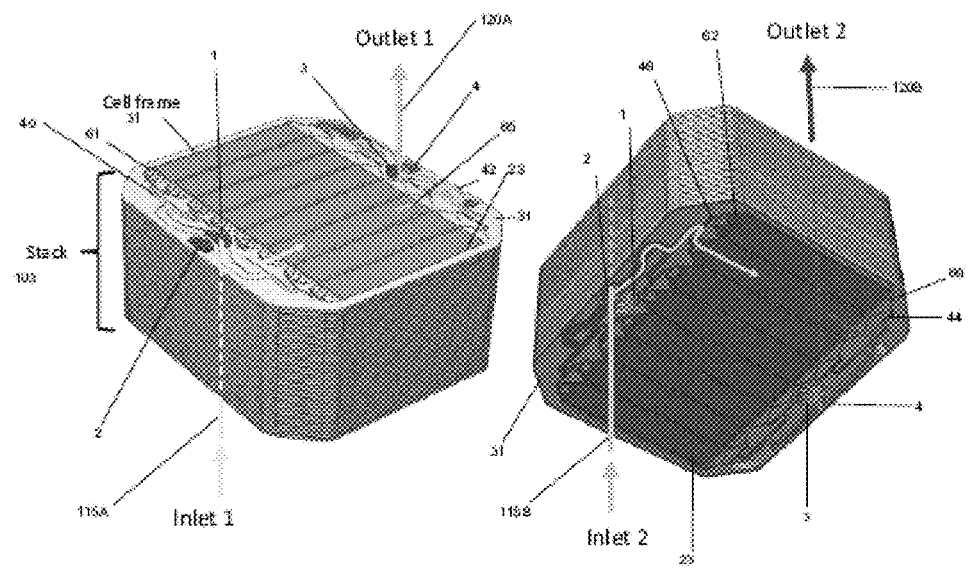
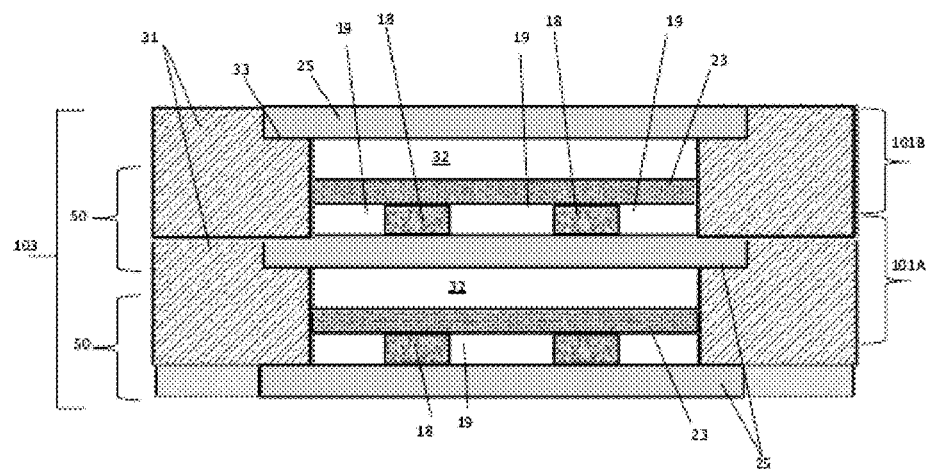

ELECTROLYTE COMPOSITIONS FOR USE IN A METAL-HALOGEN FLOW BATTERY

RELATED APPLICATIONS

This application claims the benefit of priority to U.S. Provisional Application No. 61/886,377 entitled "Electrolyte Compositions for Use in a Metal-Halogen Flow Battery" filed Oct. 3, 2013, the entire contents of which are hereby incorporated by reference.

FIELD

The present disclosure is directed to electrolytes in electrochemical systems and methods of using same.

BACKGROUND

The development of renewable energy sources has revitalized the need for large-scale batteries for off-peak energy storage. The requirements for such an application differ from those of other types of rechargeable batteries such as lead-acid batteries. Batteries for off-peak energy storage in the power grid generally are required to be of low capital cost, long cycle life, high efficiency, and low maintenance.

One type of electrochemical energy system suitable for such an energy storage is a so-called "flow battery" which uses a halogen component for reduction at a normally positive electrode in discharge mode, and an oxidizable metal adapted to become oxidized at a normally negative electrode during the normal operation of the electrochemical system. An aqueous metal halide electrolyte is used to replenish the supply of halogen component as it becomes reduced at the positive electrode. The electrolyte is circulated between the electrode area and a reservoir area. One example of such a system uses zinc as the metal and chlorine as the halogen.

Such electrochemical energy systems are described in, for example, U.S. Pat. Nos. 3,713,888, 3,993,502, 4,001,036, 4,072,540, 4,146,680, and 4,414,292, and in EPRI Report EM-I051 (Parts 1-3) dated April 1979, published by the Electric Power Research Institute, the disclosures of which are hereby incorporated by reference in their entirety.

SUMMARY

An embodiment relates to an electrolyte composition for use in a flow battery that includes an aqueous solution including at least one metal halide, at least one halogen, at least one of an anti-dendrite agent and an anti-corrosion agent, and at least one metal plating enhancer.

Another embodiment relates to an electrolyte composition for use in a flow battery that includes an aqueous solution including zinc bromide ($ZnBr_2$) and zinc chloride ($ZnCl_2$), a bromine sequestering agent, and a metal plating enhancer.

Another embodiment relates to a flow battery system including a metal halogen flow battery including a plurality of flow battery cells and a liquid electrolyte reservoir fluidly connected to the flow battery, wherein the liquid electrolyte includes an aqueous solution of a metal-halide, a halogen, a metal plating enhancer, and at least one of an anti-dendrite agent and an anti-corrosion agent.

Another embodiment relates to a method of operating a flow battery system including providing a liquid metal-halide electrolyte between a plurality of flow battery cells and a liquid electrolyte reservoir. The method includes a liquid electrolyte, wherein the liquid electrolyte includes an aqueous solution of a metal-halide, a halogen, a metal plating enhancer, and at least one of an anti-dendrite agent and an anti-corrosion agent.

Another embodiment relates to an electrolyte composition for use in a flow battery that includes an aqueous solution including at least one metal halide, at least one halogen, at least one ethylene oxide-containing surfactant, and at least one metal salt, wherein the metal salt comprises a metal that is different from the metal in the at least one metal halide.

BRIEF DESCRIPTION OF THE DRAWINGS

FIGS. 2B and 2C illustrate schematic side cross sectional views of flow paths in the flow battery cells of the system of FIG. 2A.

FIGS. 3C and 3D are respective three dimensional top and bottom views illustrating details of the stack of flow battery cells of the embodiment system of FIG. 2A.

FIG. 3E schematically illustrates side cross sectional view of an embodiment of a stack of electrochemical cells in a stack of frames through the line A'-A' in FIG. 3A

DETAILED DESCRIPTION

Figure 1:
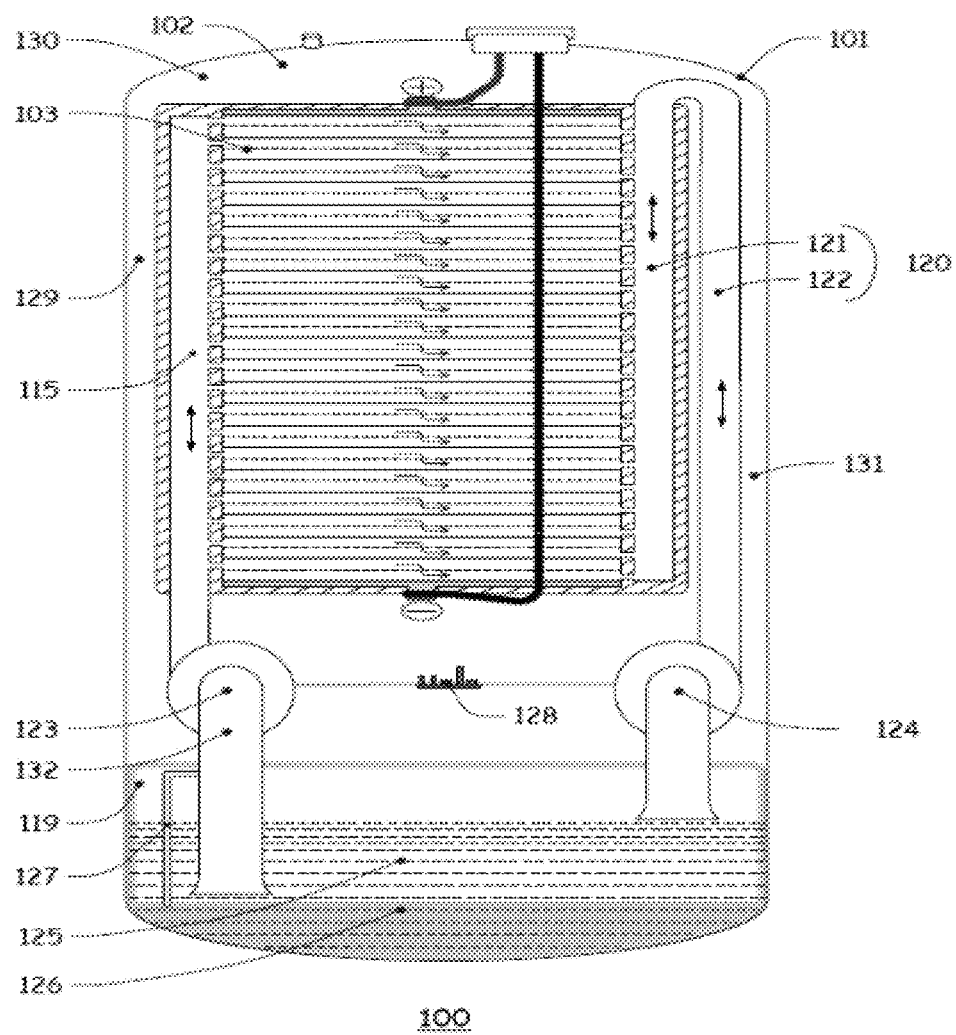
FIG. 1 illustrates a side cross sectional view of an embodiment of the electrochemical system with a sealed container containing a stack of electrochemical cells.

Traditional electrolytes used for zinc-bromide flow batteries yield lower than desired energy capacity and energy efficiency.

Embodiments of the present invention are drawn to an electrolyte composition for use in a metal-halogen flow battery system or the method of using an electrolyte composition in a flow battery system. One non-limiting advantage of the electrolyte composition is that the zinc-bromide flow battery benefits from improved performance metrics (i.e., both increased energy capacity and energy efficiency) by only changing the composition of the electrolyte solution. In other words, no hardware or operational changes are required to benefit from the various embodiments of the electrolyte compositions.

The electrolyte described herein has functional advantages in that it allows for battery cycles (i.e. consecutive charge-and-discharge) that are characterized by higher energy capacities and energy efficiencies. Additionally, these sustained improvements in performance that are sustained several hundred charge and discharge cycles.

Specifically, in an embodiment, the energy capacity of the battery is enlarged with a longer discharge duration at a constant power discharge. Additionally, the energy efficiency of the battery is improved by 10-400%, such as by 100-400% when compared to traditional additive free zinc bromide ($ZnBr_2$) systems that plate only to 90 mAh/cm$^2$.

The liquid electrolyte solution has a base formulation, which includes other additive(s). Judicious selection of the additives shows that the energy efficiency and energy capacity of the battery are increased when the additives are added to the electrolyte solution.

When the additives are present in the zinc-bromide battery electrolyte, the morphology of the zinc deposit on the negative electrode (i.e., in charge mode) is smoother than in the absence of these additives. This smoothing effect is more pronounced for deposits of zinc metal greater than 0.1 mm in thickness. In practice, the effect of the electrolyte is a sustained increase in both energy capacity and energy efficiency of the battery. Without wishing to be bound to any particular theory, it is believed that the sustained improvement in energy capacity and energy efficiency arises from a smoother morphology of the zinc deposit that results in the ability to fill the zinc charge gap more efficiently and a decrease rate of corrosion of the zinc deposit.

In one embodiment, the improved performance of the metal-halide battery is achieved by selecting electrolyte components to simultaneously achieve the following:

Reducing or eliminating dendrite or nodule formation of a significant height in the metal deposit of the metal (e.g., zinc) on the negative electrode during charge mode. For example, the deposited metal (e.g., zinc) layer lacks any nodule or dendrite whose height is approximately 10% or more of the average metal layer thickness.

Reducing the corrosion rate of metal (e.g., zinc) during charge and discharge.

Maintaining the voltaic performance of the positive and negative electrode (i.e., preventing significant reduction) and the ohmic resistance of the electrolyte (i.e., preventing increases) while reducing dendrite formation of metal deposits on the negative electrode and reducing the corrosion rate of the metal (e.g., zinc).

Maintaining a high degree of stability in the presence of bromine, which tends to oxidize many organic and inorganic species.

Suppressing side reactions, such as the generation of hydrogen gas, by maintaining pH within a preferred acidic range (e.g., pH 1 to 4, such as 2 to 4).

Various embodiments of electrolyte formulations that fulfill one or more of the above characteristics are discussed below.

In an embodiment, the electrolyte composition for use in a flow battery may include an aqueous (i.e., water) solution including a metal halide, a halogen, and at least one of an anti-dendrite agent and an anti-corrosion agent. In an embodiment, the halogen may include chlorine and/or bromine. In an embodiment, the halogen in the electrolyte composition is bromine ($B_2$).

When the halogen is bromine, then the base composition is a metal halide that comprises a metal bromide, such as zinc bromide. The electrolyte also includes a bromine complexing agent. Preferably, the electrolyte composition includes a halogen of about 1-7% (w/v) bromine. More preferably, the electrolyte composition includes about 3.75-4.1% (w/v) or 0.15-0.4 M bromine, such as 3.80-3.90% (w/v) bromine.

Weight percent or weight/volume percent ("% (w/v)") as used throughout this application is the mass of the solute in grams over the volume of the solution in milliliters, multiplied by 100.

In an embodiment, the metal of the metal halide may be zinc and the halide may be bromine or both bromine and chlorine. For example, the metal halide may be zinc bromide ($ZnBr_2$) or zinc bromide and zinc chloride ($ZnCl_2$). Preferably, the metal halide is both zinc bromide and zinc chloride.

In an embodiment, the aqueous solution includes about 0.1-68% (w/v) (or about 0.004-3 M) zinc bromide. In an embodiment, the aqueous solution includes about 0.1-68% (w/v) zinc bromide and about 0-30% (w/v) (or 0-2.2 M) zinc chloride, including 0.1-14% zinc chloride. Preferably, the aqueous solution includes about 34-44% (w/v) zinc bromide and about 3-7% (w/v) zinc chloride.

More preferably, the electrolyte composition also includes a bromine-sequestering (i.e. complexing or binding) agent and the halogen of the electrolyte composition is complexed bromine, preferably substantially without free chlorine.

In an embodiment, the sequestering agent is a single bromine sequestering agent or more than one bromine sequestering agent (i.e., a mixture of two or more sequestering agents). It should be noted, that although the sequestering agent is referred to in the singular, it is envisioned that the sequestering agent may be one or more compounds. Thus, a "sequestering agent" or a "bromine sequestering agent" may include one or more sequestering/complexing compound. In an embodiment, the sequestering agent is at least one of a morpholinium, pyrrolidinium, imidazolium, picolinium or pyridinium salt and a quaternary ammonium bromide (QBr). In an embodiment, the bromine sequestering agent is at least one of 1-dodecyl-1-methylmorpholinium bromide, 1-dodecyl-1-methylpyrrolidinium bromide, 1-dodecylpyridinium bromide, dodecyltrimethylammonium bromide, benzyldodecyldimethylammonium bromide, tetrabutylammonium bromide, 1-ethyl-1-methylpyrrolidinium bromide (MEP), and 1-ethyl-1-methyl-morpholinium bromide (MEM). In an embodiment, these compounds include any substitution derivatives of the compounds listed (e.g., those containing additional alkyl substituents) as well as different alkyl chain lengths. Preferably, the electrolyte composition includes about 7-27% (w/v) of the bromine sequestering agent. More preferably, the electrolyte composition includes the bromine sequestering agent of about 14-23% (w/v) of the bromine sequestering agent.

Without wishing to be bound to any particular theory, it is believed the bromine sequestering agent forms a thin layer of complexed bromine on the bottom of the porous (positive) electrode (described below) without attacking the metal (e.g., zinc) on the top electrode.

In an embodiment, the electrolyte composition includes the anti-dendrite agent without the anti-corrosion agent or the anti-corrosion agent without the anti-dendrite agent. Preferably, the electrolyte composition includes both the anti-dendrite agent and the anti-corrosion agent. More preferably, at least one of the anti-dendrite and the anti-corrosion agents is anionic or non-ionic poly(ethylene oxide) derivatives, such as either polyoxyethylene(20) oleyl ether (e.g., Brij™ 98) or poly-ethylene glycol, for a sustained increase in both energy capacity and energy efficiency of a zinc-bromide flow battery.

In another embodiment, the electrolyte composition includes a metal plating enhancer without an anti-corrosion agent or an anti-dendrite agent. For example, the electrolyte composition may include a bismuth salt (e.g., bismuth oxide ($Bi_2O_3$), bismuth citrate, bismuth chloride) as a metal plating enhancer along with an aqueous solution of zinc bromide ($ZnBr_2$) and zinc chloride ($ZnCl_2$) and a bromine sequestering agent.

Anti-Dendrite Agent

In an embodiment, the anti-dendrite agent in the electrolyte composition is at least one of an alkali salt of sulfopropylated polyalkoxylated beta-naphthol, poly(oxy ether), bisphenol A alkoxylate, and nicotinic acid. Preferably, the anti-dendrite agent is a surfactant such as PEG and/or bisphenol A alkoxylate. An example of the alkali salt of sulfopropylated polyalkoxylated beta-naphthol is RALUFON® NAPE 14-90 made by Raschig. An example of the bisphenol A alkoxylate is Syn Fac® made by Milliken and Company, such as Syn Fac® 8120. An example, of the poly(oxy ether) is PEG, such as PEG with a molecular weight of at least 4000 (e.g., PEG with a molecular weight of at least 8000, including 8000 to 50000). As a further example, PEG may have a molecular weight of any amount between 4000 and 50,000, such as 4000 to about 31,000 (e.g., about 4000, 4500, 5000, 5500, 6000, 6500, 7000, 7500, 8000, 8500, 9000, 9500, 10,000, 10,500, 11,000, 11,500, 12,000, 12,500, 13,000, 13,500, 14,000, 14,500, 15,000, 15,500, 16,000 16,500, 17,000, 17,500, 18,000, 18,500, 19,000, 19,500, 20,000, 20,500, 21,000, 21,500, 22,000, 22,500, 23,000, 23,500, 24,000, 24,500, 25,000, 25,500, 26,000, 26,500, 27,000, 27,500, 28,000, 28,500, 29,000, 29,500, 30,000, 30,500, or 31,000).

In an embodiment, during charge mode of the flow battery, one or more of the anti-dendrite agents added to the electrolyte solution may reduce the amount of metal (e.g., zinc) dendrites forming during their deposits on the negative electrode.

In an embodiment, the electrolyte composition includes an anti-dendrite agent of about 0.01-1.5% (w/v) of an alkali salt of sulfopropylated polyalkoxylated beta-naphthol and about 0.001-0.1% (w/v) nicotinic acid. Preferably, the electrolyte composition includes an anti-dendrite agent of about 0.09-0.4% (w/v) of an alkali salt of sulfopropylated polyalkoxylated beta-naphthol and about 0.0-0.01-0.07% (w/v) nicotinic acid. More preferably, the electrolyte composition includes an anti-dendrite agent of about 0.2% (w/v) alkali salt of sulfopropylated polyalkoxylated beta-naphthol and about 0.04% (w/v) nicotinic acid. The anti-dendrite agent may include any weight percent increment of an alkali salt of sulfopropylated polyalkoxylated beta-naphthol between about 0.01-1.5% (w/v), such as about 0.01, 0.02, 0.03, 0.04, 0.05, 0.06, 0.07, 0.08, 0.09, 0.10, 0.11, 0.012, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. The anti-dendrite agent may include any weight percent increment of nicotinic acid between about 0.001-0.1% (w/v), such as about 0.020, 0.021, 0.022, 0.023, 0.024, 0.025, 0.026, 0.027, 0.028, 0.029, 0.030, 0.031, 0.032, 0.034, 0.035, 0.036, 0.037, 0.038, 0.039, 0.040, 0.041, 0.042, 0.043, 0.044, 0.045, 0.046, 0.047, 0.048, 0.049, or 0.050.

In an embodiment, the electrolyte composition includes an anti-dendrite agent of about 0.01-5% (w/v) bisphenol A alkoxylate, such as about 0.1-4% (w/v) bisphenol A alkoxylate. Preferably, the electrolyte composition includes an anti-dendrite agent of about 0.5-3% (w/v) bisphenol A alkoxylate. More preferably, the electrolyte composition includes an anti-dendrite agent of about 1.4% (w/v) bisphenol A alkoxylate. The anti-dendrite agent may include any weight percent increment of bisphenol A alkoxylate between about 0.01-5% (w/v), such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0.

Anti-Corrosion Agent

In an embodiment, the electrolyte composition includes an anti-corrosion agent. Preferably, the anti-corrosion agent is at least one of benzotriazole, zinc phosphate, triethylamine, ethanolamine, and poly(oxy ether). In an embodiment, the anti-corrosion agent is the poly(oxy ether) such as PEG with a molecular weight of at least 4000. In an alternative embodiment, the poly(oxy ether) has a molecular weight of at least 8000, such as 8000 to 30000. Preferably, the electrolyte composition includes poly(oxy ether) (e.g., PEG) as the anti-corrosion agent with a molecular weight of 18000-25000. For example, the PEG may have a molecular weight of any increment between 4000 and 30000, such as about 4000, 4500, 5000, 5500, 6000, 6500, 7000, 7500, 8000, 8500, 9000, 9500, 10,000, 10,500, 11,000, 11,500, 12,000, 12,500, 13,000, 13,500, 14,000, 14,500, 15,000, 15,500, 16,000 16,500, 17,000, 17,500, 18,000, 18,500, 19,000, 19,500, 20,000, 20,500, 21,000, 21,500, 22,000, 22,500, 23,000, 23,500, 24,000, 24,500, 25,000, 25,500, 26,000, 26,500, 27,000, 27,500, 28,000, 28,500, 29,000, 29,500, or 30,000.

In an embodiment, the anti-corrosion agent is about 0.1-2% (w/v) poly(oxy ether) (e.g., PEG), preferably 0.05-1.5% (w/v) poly(oxy ether) (e.g., PEG). For example, the anti-corrosion agent may include any weight percent increment of a poly(oxy ether) between about 0.1-2% (w/v), such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0.

In an embodiment, the anti-corrosion agent reduces the corrosion rate (i.e., dissolution) of the metal (e.g., zinc) during the charge and discharge modes of the flow battery. In an embodiment, the electrolyte solution includes about 0-5% (w/v) (e.g. 1-3% (w/v)) of an anti-corrosion agent.

Other Additives

In various other embodiments, the electrolyte composition may include one or more optional additives. The additives may be selected from at least one of a buffer, a nucleation agent, a chelating agent, a metal plating enhancer, an electrical conductivity enhancer, a dispersion agent, a viscosity controller, and a stability enhancing agent. In an embodiment, the electrolyte composition comprises any number combinations of the additives with the metal-halide aqueous solution, the sequestering agent, the halogen, and/or the anti-dendrite agent. Generally, all additives may include about 0-5% (w/v) (e.g., 1-3% (w/v)) of the electrolyte composition. Each type of additive is discussed below.

Buffer

In an embodiment, the electrolyte composition includes a buffer. Preferably, the buffer maintains the pH of the electrolyte solution in an acidic range, such as a range of about 1-4 (e.g., a pH of 2-4). In an embodiment, the electrolyte composition includes the buffer additive of at least one of potassium tetraoxalate, sulfuric acid, sodium sulfate, boric acid, phosphoric acid, sodium dihydrogen phosphate, potassium chloride, sodium citrate, vanadyl sulfate, sodium benzoate, potassium phosphate, potassium sulfate, potassium triphosphate, and sodium triflouroacetate.

In an embodiment, the electrolyte composition includes a buffer of about 0.001-0.5% (w/v) sodium benzoate, preferably, about 0.01-0.2% (w/v) sodium benzoate.

In an embodiment, the electrolyte composition includes a buffer of 0.001-0.1% (w/v) vanadyl sulfate ($VOSO_4$), preferably about 0.01-0.05% (w/v) vanadyl sulfate.

In an embodiment, the buffer helps suppress side reactions within the electrolyte solution during charge/discharge mode of the flow battery system. For example, hydrogen gas generation is common when operating the flow battery system. However, hydrogen gas generation may be reduced or prevented when operating the flow battery by using a buffer, such as sodium benzoate or vanadyl sulfate, in the electrolyte solution of the flow battery to maintain the solution pH in the acidic range.

Nucleation Agent

In an embodiment, the electrolyte composition includes the nucleation agent as the additive. In an embodiment, the nucleation agent is vanadyl sulfate ($VOSO_4$). Preferably, the electrolyte composition includes about 0.001-0.1% (w/v) vanadyl sulfate. More preferably, the electrolyte composition includes about 0.01-0.05% (w/v) vanadyl sulfate. Expressed in other units, in an embodiment, the electrolyte composition includes about 1-3 mM vanadyl sulfate (e.g., 2 mM vanadyl sulfate).

In an embodiment, the nucleation agent mimics the anti-dendrite agent. The nucleation agent may prevent preferential metal (e.g., zinc) nucleation on the negative electrode (e.g., titanium electrode), thereby preventing metal dendrite growth on the electrode.

In an embodiment, the electrolyte composition includes vanadyl sulfate which functions as at least one of the nucleation agent and the buffer. In an embodiment, the vanadyl sulfate functions only as the nucleation agent. In an embodiment, the vanadyl sulfate functions only as the buffer. In an embodiment, the vanadyl sulfate functions as both the nucleation agent and the buffer.

Chelating Agent

In an embodiment, the electrolyte composition includes the chelating agent as the additive. In an embodiment, the chelating agent is an aminopolycarboxylic acid, such as ethylenediaminetetraacetic acid (EDTA) or derivatives thereof.

In an embodiment, the chelating agent reduces or prevents solution components (e.g., surfactants or any other component) from creating phase separations within the mixture.

Metal Plating Enhancer

In an embodiment, the electrolyte composition includes the metal plating enhancer additive. In an embodiment, the electrolyte composition includes the metal plating enhancer additive such as a metal salt or organic compounds such as an organic alcohol. In an embodiment, the includes the metal plating enhancer additive of at least one of bismuth oxide ($Bi_2O_3$), bismuth citrate, bismuth chloride, germanium oxide, antimony oxide, tin chloride, lead chloride ($PbCl_2$), sodium benzoate, and 2-ethylhexanol.

In an embodiment, the electrolyte composition includes the metal plating enhancer where the metal plating enhancer is sodium benzoate. Preferably, the metal plating enhancer includes about 0.001-0.5% (w/v) sodium benzoate. More preferably, the metal plating enhancer includes about 0.01-0.2% (w/v) sodium benzoate.

In an embodiment, the metal plating enhancer is 2-ethylhexanol. Preferably, the metal plating enhancer includes about 0.001-1% (w/v) 2-ethylhexanol. More preferably, the metal plating enhancer includes about 0.001-0.1% (w/v) 2-ethylhexanol. Even more preferably, the metal plating enhancer includes about 0.003-0.008% (w/v) 2-ethylhexanol.

In an embodiment, the electrolyte composition includes the metal plating enhancer where the metal plating enhancer is both sodium benzoate and 2-ethylhexanol. Preferably, the metal plating enhancer includes about 0.001-0.5% (w/v) sodium benzoate and about 0.001-1% (w/v) 2-ethylhexanol. More preferably, the metal plating enhancer includes about 0.01-0.2% (w/v) sodium benzoate and about 0.001-0.1% (w/v) 2-ethylhexanol. Even more preferably, the metal plating enhancer includes about 0.04-0.15 (w/v) sodium benzoate and about 0.003-0.008% (w/v) 2-ethylhexanol.

In an embodiment, the metal plating enhancer, such as bismuth oxide ($Bi_2O_3$), may initially plate bismuth on the negative electrode (e.g., titanium electrode) making the plating of zinc on the bismuth layer on the negative electrode more uniform (i.e., less dendrites may form) during charge mode.

Conductivity Enhancer

In an embodiment, the electrolyte composition includes the conductivity enhancer additive. In an embodiment, the electrolyte composition includes the conductivity enhancer additive of at least one of potassium chloride, sodium chloride, hydrogen chloride, lithium chloride, magnesium chloride (and/or zinc-chloride of the base composition).

The conductivity enhancer provides a base conductivity within the aqueous electrolyte. For example, in a flow battery system with a zinc-bromide electrolyte, the addition of potassium chloride and/or zinc chloride may provide a baseline conductivity within the aqueous electrolyte because it does not get consumed by the zinc-bromide flow battery while the flow battery does consume the zinc bromide.

Dispersion Agent

In an embodiment, the electrolyte composition includes the dispersion agent additive. In an embodiment, the electrolyte composition includes surfactant type dispersion agent additive, such as at least one of poly(oxy ether), an alkali salt of sulfopropylated polyalkoxylated beta-naphthol, bisphenol A alkoxylate, and a combination of a perfluoroalkyl substituted polyether with a dipropylene glycol monomethyl ether. Preferably, the dispersion agent is the poly(oxy ether), such as PEG. More preferably the dispersion agent is a poly(oxy ether) (e.g., PEG) with a molecular weight of no more than 8,000, such as 1-8,000 (e.g., 1000-3,000 MW).

Similar to the anti-dendrite agent discussed above, an example of the alkali salt of sulfopropylated polyalkoxylated beta-naphthol is RALUFON® NAPE 14-90 made by Raschig. An example of the bisphenol A alkoxylate is Syn Fac® made by Milliken and Company, such as Syn Fac® 8120. An example of the combination of a perfluoroalkyl substituted polyether with a dipropylene glycol monomethyl ether is a co-polymer such as S-550 made by Chemguard.

In an embodiment, the dispersion agent is the same as the anti-dendrite agent. In another embodiment, the dispersion agent is different from the anti-dendrite agent.

In an embodiment, the dispersion agent such as a low molecular weight poly (oxy ether) (i.e., PEG or PEG like derivatives) may help the solubility of the solution components. The low molecular weight (i.e., no more than 8,000 MW) poly (oxy ether) may be more soluble than other higher molecular weight such as a 20,000 MW poly (oxy ether). Thus, the dispersion agent may have lower molecular weight PEG and higher molecular weight PEG in the same electrolyte. The lower molecular weight PEG may be the dispersion agent and the higher molecular weight PEG may be the anti-dendrite agent.

Viscosity Controller

In an embodiment, the electrolyte composition includes the viscosity controller additive. In an embodiment, the electrolyte composition includes the viscosity controller additive of at least one of poly(oxy ether) and bisphenol A alkoxylate. As discussed above, an example of the bisphenol A alkoxylate is Syn Fac® made by Milliken and Company, such as Syn Fac® 8120.

A viscosity controller, such as a higher molecular weight PEG, or PEG like derivatives (i.e., poly(oxy ether)), tends to sequester into the ionic phase (e.g., complexed bromine phase) of the electrolyte solution. Lower molecular weight PEG or PEG like derivatives tend to be more soluble in the aqueous phase. Thus, the viscosity controller (i.e., a high molecular weight PEG like derivative) precipitates from the aqueous phase and into the ionic phase by significantly increasing its viscosity. Moreover, the viscosity controller may aid the sequestering agent and/or the sequestered bromine to separate from the aqueous phase, which may help the metal (e.g., zinc) in the aqueous phase to plate on the negative electrode during charge mode.

In an embodiment, a PEG like derivative with a molecular weight of 5000-7000 may be both a viscosity controller and a dispersion agent. In an embodiment, the electrolyte solution may comprise a mixture of a viscosity controller and a dispersion agent. For example, an electrolyte solution may include a PEG (or PEG like derivative) with a molecular weight less than 5000 (e.g., 1000 to 4000) as the viscosity controller and a PEG or PEG like derivative with a molecular weight greater than 8000 (e.g., 18000 to 25000) as a dispersion agent. In an embodiment, the viscosity controller/dispersion agent may also be an anti-dendrite agent or an anti-corrosion agent or may function similar to an anti-dendrite agent/anti-corrosion agent.

Stability Enhancer

In an embodiment, the electrolyte composition includes the stability enhancer additive. In an embodiment, the electrolyte composition includes a fluorinated organic species stability enhancer, such as at least one of a combination of a perfluoroalkyl substituted polyether with a dipropylene glycol monomethyl ether, a perfluoroalkylsulfonic acid, and a perfluorooctanoic acid. As discussed above, the combination of a perfluoroalkyl substituted polyether with a dipropylene glycol monomethyl ether may be a co-polymer such as S-550 made by Chemguard. An example of the perfluoroalkyl sulfonic acid is Capstone™ FS-10 made by DuPont™.

In an embodiment, the electrolyte composition includes a stability enhancer of about 0.01-4% (w/v) of a combination of a perfluoroalkyl substituted polyether with a dipropylene glycol monomethyl ether, such as 0.05-1.5% (w/v) of a combination of a perfluoroalkyl substituted polyether with a dipropylene glycol monomethyl ether.

In an embodiment, the stability enhancers are generally fluorinated surfactants. These fluorinated surfactants provide better stability by preventing halogen (e.g., bromine) oxidation during operating of the metal-halide flow battery, thereby minimizing loss in surface functionality.

In an embodiment, the base electrolyte composition for use in a flow battery includes an aqueous solution (i.e., water) including zinc bromide (ZnBr$_2$) and zinc chloride (ZnCl$_2$), a bromine sequestering agent, and an anti-dendrite agent of bisphenol A alkoxylate (BPA).

In an embodiment, the electrolyte composition includes an aqueous solution including zinc bromide (ZnBr$_2$) and zinc chloride (ZnCl$_2$), a bromine sequestering agent, an anti-dendrite agent of bisphenol A alkoxylate, and an anti-corrosion agent including poly (oxy ether) (e.g., PEG) with a molecular weight of about 20,000.

In an embodiment, the electrolyte composition includes an aqueous solution including zinc bromide (ZnBr$_2$) and zinc chloride (ZnCl$_2$), a bromine sequestering agent, an anti-dendrite agent of bisphenol A alkoxylate, and a metal plating enhancer of a bismuth salt. In an embodiment, the bismuth salt is at least one of bismuth oxide, bismuth chloride, and bismuth citrate.

In an embodiment, the electrolyte composition includes an aqueous solution including zinc bromide (ZnBr2) and zinc chloride (ZnCl2), a bromine sequestering agent, and a metal plating enhancer of a bismuth salt. In an embodiment, the bismuth salt is at least one of bismuth oxide, bismuth chloride, and bismuth citrate.

In an embodiment, the electrolyte composition includes an aqueous solution (i.e., water) including zinc bromide (ZnBr$_2$) and zinc chloride (ZnCl$_2$), a bromine sequestering agent, an anti-dendrite agent of nicotinic acid and polyalkoxylated beta-naphthol, and a metal plating enhancer of 2-ethylhexanol. In an embodiment, the electrolyte composition includes an aqueous solution (i.e., water) including zinc bromide (ZnBr$_2$) and zinc chloride (ZnCl$_2$), a bromine sequestering agent, an anti-dendrite agent of nicotinic acid and an alkali salt of sulfopropylated polyalkoxylated beta-naphthol, and a metal plating enhancer of 2-ethylhexanol.

In an embodiment, the electrolyte composition includes an aqueous solution including zinc bromide (ZnBr$_2$) and zinc chloride (ZnCl$_2$), a bromine sequestering agent, an anti-dendrite agent of nicotinic acid and polyalkoxylated beta-naphthol, a metal plating enhancer of 2-ethylhexanol, and a sodium benzoate buffer and metal plating enhancer. In an embodiment, the electrolyte composition includes an aqueous solution including zinc bromide (ZnBr$_2$) and zinc chloride (ZnCl$_2$), a bromine sequestering agent, an anti-dendrite agent of nicotinic acid and an alkali salt of sulfopropylated polyalkoxylated beta-naphthol, a metal plating enhancer of 2-ethylhexanol, and a sodium benzoate buffer and metal plating enhancer.

Synergistic Compositions

In various embodiments, improvements to performance of the metal-halide battery may be further enhanced by providing multiple performance-improvising additives to the electrolyte composition. While the performance improving actions and/or mechanisms of such additives may be similar to or different from one another, in combination these additives may achieve overall performance improvements for the metal-halide battery that are greater than the collective sum of the separate individual performance improvements.

In an embodiment, a combination of at least one polydentate ligand, such as an ethylene oxide-containing surfactant, and at least one heavy metal salt may be added to the electrolyte solution to enhance the plating morphology of the metal (e.g., zinc) on the negative electrode during charge mode while remaining stable in a brominated environment. In the various embodiments, the term "heavy metal" may be used to refer to a metal that is heavier than the plating metal (e.g., heavier than zinc). In some embodiments, the ethylene oxide-containing surfactant may be a bisphenol A (BPA) alkoxylate composition (e.g., Syn Fac® 8120 made by Milliken Chemical). The BPA alkoxylate composition may have the following structure:

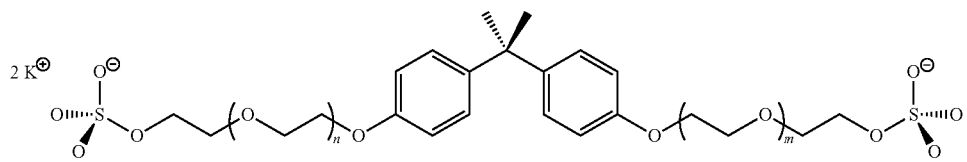

where "m" and "n" each represent between 8 and 24 repeating ethylene oxide units, thereby providing variable chain lengths. An example BPA alkoxylate composition (and/or compound) in which m=13 and n=14 may have a formula of $C_{69}H_{122}K_2O_{35}S_2$, where BPA provides the aromatic part of the compound and poly(ethylene oxide) makes up the polymer chains. In some embodiments, the synergistic combination of additives may include multiple ethylene oxide-containing containing surfactants, such as an additional poly(ethylene oxide) ("PEG") composition in addition to the BPA alkoxylate. In some embodiments, the PEG composition may be any number of repeated ethylene oxide units.

In other embodiments, the ethylene oxide-containing surfactant may be an alkali salt of sulfopropylated polyalkoxylated beta-naphthol (e.g., RALUFON® NAPE 14-90 made by Raschig). The alkali salt of sulfopropylated polyalkoxylated beta-naphthol may have the following structure:

where "n" represents between 1 and 3 repeating isopropanol or ethylene glycol units and "m" represents between 5 and 25 repeating ethylene oxide units, thereby providing a structure with variable chain lengths. In an example composition of the above structure, m=17 and n=2.

In other embodiments, the ethylene oxide-containing surfactant may be an ethoxylated fluorosurfactant (e.g., S-550 made by Chemguard). The ethoxylated fluorosurfactant may have the following structure:

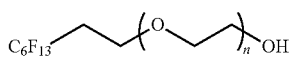

where "n" represents between 8 and 32 repeating ethylene oxide units, thereby providing a structure with variable chain lengths. In an example composition of the above structure, n=12.

In some embodiments, the at least one heavy metal salt may be a bismuth salt (e.g., bismuth oxide ($Bi_2O_3$), bismuth citrate, bismuth chloride, etc.) or a lead salt (e.g., lead chloride ($PbCl_2$)). The at least one heavy metal salt may be a metal plating enhancer that initially plates the heavy metal on the negative electrode, as described in further detail above.

The combination of the at least one ethylene oxide-containing surfactant and heavy metal salt unexpectedly results in significant enhancements in the plating morphology of zinc during charge mode. Such enhancements may include minimizing dendrite formation in the zinc deposited on the negative electrode in charge mode thereby providing a smoother zinc deposit on the negative electrode. For example, reducing dendrite formation may be achieved if the deposited metal (e.g., zinc) lacks any dendrite whose height is approximately 10% or more of the average metal layer thickness. The smooth zinc deposit may decrease the rate of corrosion of the zinc deposit, thereby increasing the energy capacity and energy efficiency of the battery. Such enhancements may also include achieving a capacity (i.e., loading target) for the negative electrode of 200 milliampere-hour (mAh)/$cm^2$ of zinc.

Specifically, the improvements in zinc plating from the combination are greater than those that would be expected by adding the results obtained using only the ethylene oxide-containing surfactant as an electrolyte additive to the results obtained using only the heavy metal salt as an electrolyte additive.

Without wishing to be bound by a particular theory, it is believed that ethylene oxide and its derivatives bind to a metal surface, and therefore that the presence of ethylene oxide and/or ethylene oxide derivatives may affect the outcome of an electrodeposition process. Further, heavy metals (e.g., bismuth or lead) may be incorporated into a metal (e.g., zinc) being deposited. Therefore, the presence of such bismuth or lead ions may change the crystal structure of the deposit relative to one of pure zinc. Also, without wishing to be bound by a particular theory, it is believed that heavy metals (e.g., bismuth or lead) may change the morphology of zinc plating by incorporating into the deposit and changing the crystal structure of the deposit relative to one of pure zinc.

Without wishing to be bound to any particular theory, the synergistic effects of various combinations of additives to enhance plating of a metal (e.g., zinc) onto the negative electrode may be the result of a number of molecular/atomic interactions. That is, the ethylene oxide chains of Syn Fac 8120 may bind to the surface of the zinc deposit, while the aromatic groups of the Syn Fac 8120 may bind to the heavy metal (e.g., bismuth). For example, references in the literature demonstrate that bismuth ions interact with aromatic moieties to form arene complexes, one of which is C. Silvestru et al., "Structural Chemistry of Bismuth Compounds, I. Organobismuth Derivatives (section G, Arene Complexes of Bismuth, pages 3305-3310)," CHEMICAL REVIEWS 99:3277-3328 (1999), herein incorporated by reference in its entirety. In this manner, the bismuth or other heavy metal may be brought into the proximity of the zinc deposit. Also, without wishing to be bound by a particular theory, in the highest density regions (i.e., peaks in the deposit), ethylene oxide chains may collect in larger amounts, which may in turn case higher binding of bismuth in these regions (i.e., through the aromatic group binding), promoting flattening of the zinc deposit.

Figure 7A:
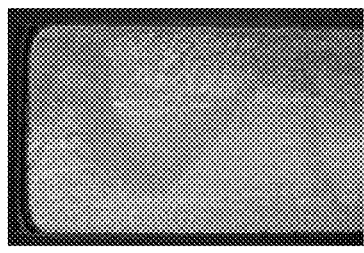
FIG. 7A is an image of the negative electrode in a metal-halide flow battery in which an ethylene oxide-containing surfactant alone was added to the electrolyte solution.
Figure 7B:
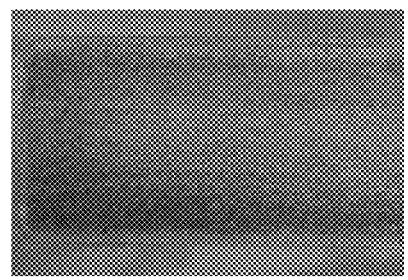
FIG. 7B is an image of the negative electrode in a metal-halide flow battery in which a heavy metal salt alone was added to the electrolyte solution.
Figure 7C:
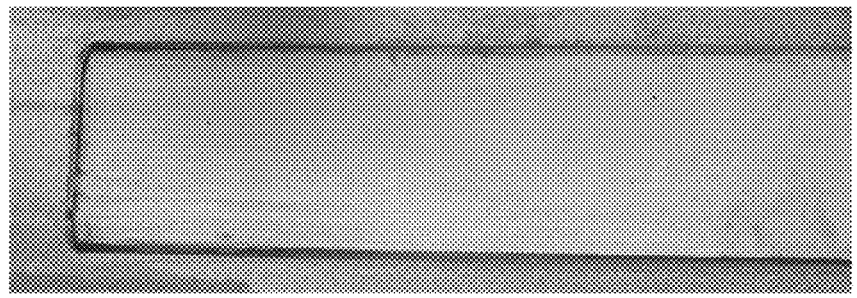
FIG. 7C is an image of the negative electrode in a metal-halide flow battery in which a combination of an ethylene oxide-containing surfactant and heavy metal salt were added to the electrolyte solution.

Comparative effects of individual electrolyte additives and of a synergistic combination of additives on the metal deposits formed on negative electrodes of an example metal-halide flow battery are shown in FIGS. 7A-7C. A base electrolyte was prepared as an aqueous solution containing 1.84M $ZnBr_2$, 0.40 M $ZnCl_2$, 0.12M $Br_2$, and a bromine complexing agent. A desired thickness of a zinc layer deposited on the negative electrode corresponds to a zinc loading of 200 mAh/$cm^2$. In a first comparative example, Syn Fac 8120 was added to the base electrolyte without any other additives, and a charge cycle was run. As shown in the image of the negative electrode in FIG. 7A, the first comparative example resulted in dendrites forming across the zinc charge gap, and resulted in the battery shorting once zinc loading reached around 187 mAh/$cm^2$. In a second comparative example, bismuth ions ($Bi^{3+}$) were added to the base electrolyte without any other additives (i.e., in the form of a bismuth salt), and a charge cycle was run. Results of the second comparative example show that the flow battery was able to achieve the desired zinc deposition thickness (i.e., loading of 200 mAh/$cm^2$). However, as shown in the image of the negative electrode in FIG. 7B, the second comparative example also resulted in dendrite formation during zinc deposition, thereby creating a rough surface of the zinc layer.

In a third example, a synergistic combination of Syn Fac 8120 and bismuth ions were added to the base electrolyte, and a charge cycle was run, producing unexpected results. That is, results of the third example show that the flow battery was able to achieve the desired zinc deposition thickness (i.e., loading of 200 mAh/$cm^2$), and had the highest efficiency of the three examples. As shown in the image of the negative electrode in FIG. 7C, the third example also resulted in minimal or no dendrite formation, creating a very smooth surface of the zinc layer.

In various embodiments, in addition to the enhancements to zinc plating on the negative electrode during charge mode, a synergistic combination of additives may improve viscosity control in the electrolyte. In an embodiment, the additives may include at least one poly(ethylene oxide) polymer of a specific molecular weight and at least one nitrogen-based ionic liquid in addition to the ethylene oxide-containing surfactant and at least one heavy metal. In various embodiments, the nitrogen-based ionic liquid phase may be, for example, a solvent (e.g., $H_2O$) containing an imidazolium, a pyridinium, a morpholinium, a pyrolidinium, an ammonium bromide salt, etc. In various embodiments, the poly(ethylene oxide) composition may be PEG having a weight average molecular weight ($M_w$) of 1000-300,000 Daltons.

Figure 8A:
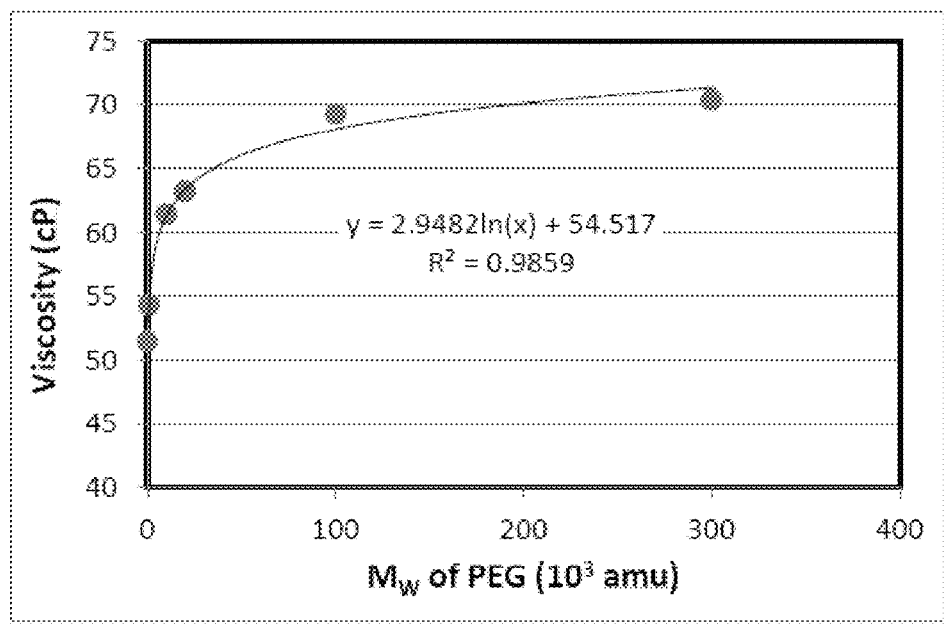
FIG. 8A is a graph showing the ionic liquid phase viscosity versus weight average molecular weight ($M_w$) of a PEG additive in the electrolyte of an embodiment flow battery.

Specifically, in various embodiments the viscosity of the nitrogen-based ionic liquid may be altered through selecting various PEG compositions that have a $M_w$ of 1000-300,000 Daltons. The measured viscosity has a logarithmic relationship to $M_w$, and therefore the viscosity of the electrolyte may be selected systematically. In an example, a base electrolyte was prepared as an aqueous solution containing 1.64 M $ZnBr_2$, 0.36 M $ZnCl_2$, 0.24 M $Br_2$, and at least one complexing agent, to which a combination of additives was provided that contained at least a nitrogen-based ionic liquid (e.g., an imidazolium salt), an ethylene oxide-containing surfactant (e.g., Syn Fac 8120), and 1% (w/v) PEG having a $M_w$ of 1,000-300,000 Daltons. The variation of the ionic liquid phase viscosity as a function of the $M_w$ of the PEG additive is shown in the graph in FIG. 8A, which illustrates the enhanced control of viscosity based on $M_w$ of PEG. As shown in the graph, viscosity increased as the PEG $M_w$ increased.

Figure 8B:
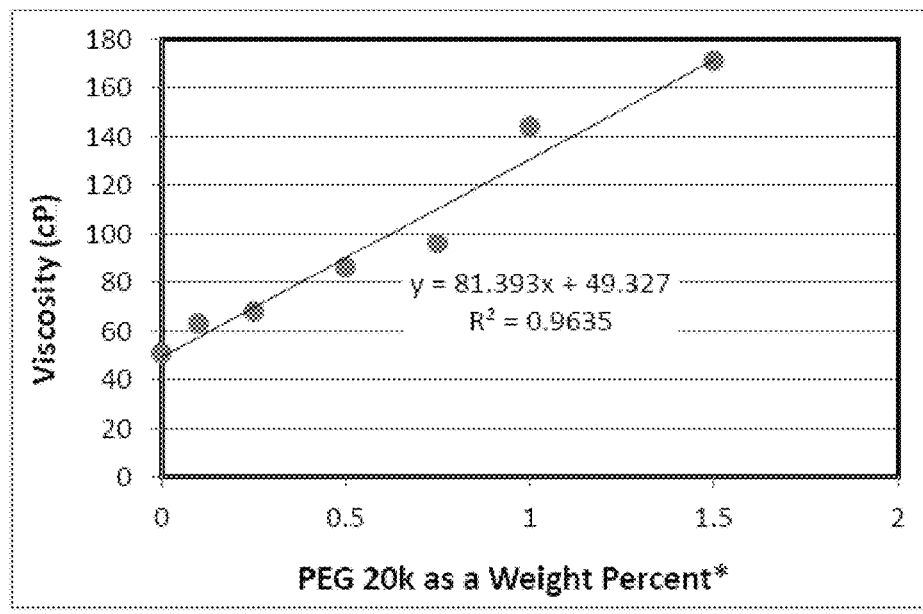
FIG. 8B is a graph showing the ionic liquid phase viscosity versus weight percent for an electrolyte additive of PEG having a $M_w$ of 20,000 Daltons in the electrolyte of an embodiment flow battery.
Figure 8C:
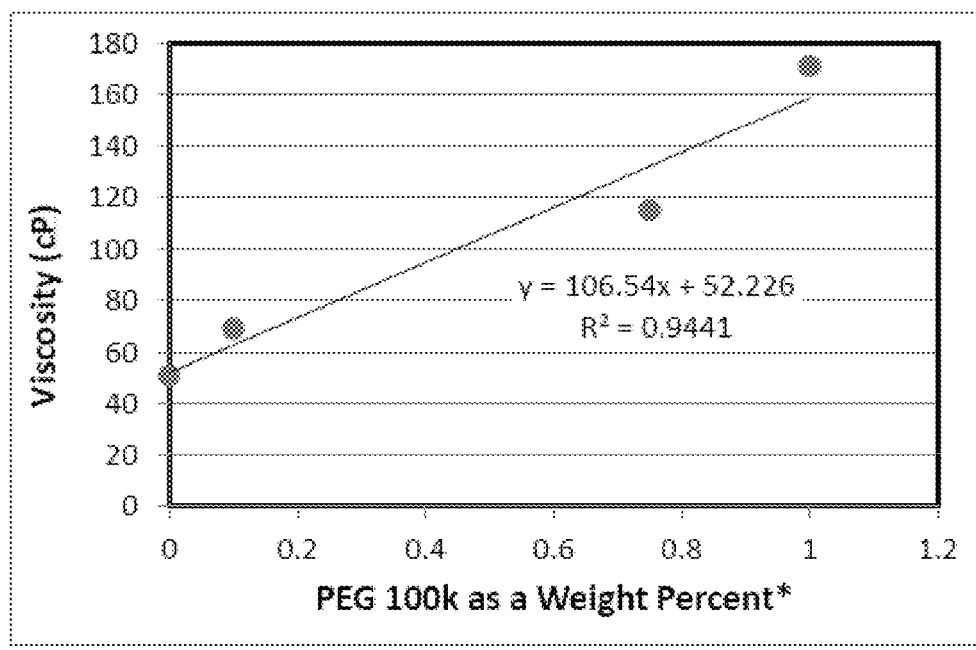
FIG. 8C is a graph showing the ionic liquid phase viscosity versus weight percent for an electrolyte additive of PEG having a $M_w$ of 100,000 Daltons in the electrolyte of an embodiment flow battery.

In addition to modifying the viscosity by selecting PEG $M_w$, in various embodiments the viscosity of the ionic liquid phase may be controlled based on the weight percent of PEG in the final electrolyte solution (i.e., concentration of PEG). In particular, adding PEG having a $M_w$ of 20,000 or 100,000 Daltons in amounts between 0.1 and 2.0 weight percent may alter (i.e., increase) the viscosity. In an example, a combination of additives including at least a nitrogen-based ionic liquid (e.g., an imidazolium salt), an ethylene oxide-containing surfactant (e.g., Syn Fac 8120), and PEG having a $M_w$ of either 20,000 or 100,000 Daltons was provided to the base electrolyte described above with respect to FIG. 8A. The variations of the ionic liquid phase viscosity as functions of the 20,000 Dalton PEG (called "PEG 20,000") and 100,000 Dalton PEG (called "PEG 100,000") additives are shown in the graphs in FIGS. 8B and 8C, respectively, thereby illustrating the enhanced control of viscosity based on weight percent of PEG. As shown in the graph, viscosity increased as the weight percent of PEG increased.

The enhanced viscosity control provided by PEG addition enables selection of a target viscosity for the nitrogen-based ionic liquid phase (and for the electrolyte solution as a result), as well as degree of phase separation. In various embodiments, the target viscosity may be a function of a complexing agent and the system design. For example, if the flow resistance in the system is high, the target viscosity may be relatively low, compared to a low flow resistance system in which a lowered viscosity is not needed. In another example, if the complexing agent in the electrolyte exhibits poor separation, the target viscosity may be relatively high because the viscosity controller (e.g., PEG) may bind to the complexing agent and improve the phase separation. Conversely, if the complexing agent exhibits normal separation, the increased viscosity is not needed and the target viscosity may be lower by comparison. In various embodiments, the lower viscosity may be achieved by adding PEG with a $M_w$ that is less than 50,000 Daltons and/or adding less than or equal to 1% (w/w) PEG. In various examples, the higher viscosity may be achieved by adding PEG with a $M_w$ that is greater than or equal to 50,000 Daltons and/or adding more than 1% (w/w) PEG. In an example using the base electrolyte solution described above with respect to FIGS. 8A-8C, a preferred viscosity may be achieved using a combination of additives that includes 1.44% (w/v) Syn Fac 8120 and 1% (w/w) PEG having a $M_w$ of 20,000 Daltons. In an embodiment, at the onset of the charge mode, the target viscosity may be within the range of 50-125 cPs at 35° C.

As an alternative to PEG, the combination of additives may include at least one secondary anion to alter the viscosity of the nitrogen-based ionic liquid phase in the electrolyte solution. The secondary anion may be provided in the form of an acid, lithium salt, sodium salt, etc.

In an example, a base electrolyte was prepared as an aqueous solution containing 1.0 M $ZnBr_2$, 0.36 M $ZnCl_2$, 0.9 M $Br_2$, and at least one complexing agent, to which a combination of additives was provided that contained at least a nitrogen-based ionic liquid (e.g., an imidazolium salt), an ethylene oxide-containing surfactant (e.g., Syn Fac 8120), and a 0.2 M composition containing an anion selected from bistriflimide, nonaflate, triflate, bromate, and dicyanamide. A summary of the effects of providing additives containing various anions on the viscosity of the nitrogen-based ionic liquid phase are provided in the table below:

| Anion | None | $[(Tf)_2N]^-$ | $[(Tf)_2N]^-$ | $ONf^-$ | $OTf^-$ | $BrO_3^-$ | $[N(CN)_2]^-$ |
|---|---|---|---|---|---|---|---|
| Added in the form of | N/A | Lithium bistriflimide | bistriflimide acid | Potassium nonaflate | Potassium Trifliate | Potassium Bromate | Sodium dicyanamide |
| Viscosity (cP) | 153 | 90 | 90 | 119 | 126 | 141 | 296 |
| Viscosity is | | | Decreased | | | Unchanged | Increased | where $Tf = SO_2CF_3$ and $Nf = SO_2C_4F_9$.

where $Tf=SO_2CF_3$ and $Nf=SO_2C_4F_9$.

Other advantages of the synergistic combinations of electrolyte additives discussed herein may relate to the positive electrode. As discussed in further detail below, a positive electrode may be made of a porous metal and coated with a metal oxide, such as a porous titanium electrode coated with a noble metal oxide. In various embodiments, combinations of a heavy metal (e.g., bismuth) salt, an ethylene oxide-containing surfactant (e.g., Syn Fac 8120), and optionally other additives, such as a chelating agent (e.g., EDTA), a poly(ethylene oxide) polymer of fixed $M_w$ or weight percent (e.g., PEG 20,000), etc. may reduce corrosion of the positive electrode. Specifically, corrosion of the porous metal (e.g., titanium) may cause noble metal ions to leach into the electrolyte solution during charge mode. Therefore, preventing the corrosion of titanium also prevents dissolution of the noble metal from the porous electrode.

While various synergistic combinations of additives are discussed above, the individual additives and improvements are discussed in further detail below, and may also be used in create combinations of additives to enhance such improvements in flow battery systems.

Example Formulations

In each non-limiting example formulations described below, the base formulation has a greater longevity in an operating metal-halide flow battery (i.e., a metal-halide flow battery with battery cycles that are characterized by higher energy capacities and energy efficiencies) than a traditional metal-halide electrolyte lacking similar compounds.

In an embodiment, the electrolyte composition includes an aqueous solution of a metal-halide and a halogen or a mixture of a metal-halide, a bromine halogen, and a bromine sequestering agent, and at least one of an anti-corrosion agent and anti-dendrite agent, or both an anti-corrosion agent and an anti-dendrite agent.

Base Electrolyte

In an embodiment, the electrolyte composition includes an aqueous solution of a metal-halide or a mixture of a metal-halide, a halogen, and a sequestering agent, collectively herein referred to as the "base electrolyte". Preferably, the electrolyte composition includes a base electrolyte which is a mixture of a metal-halide of about 0.1-68% (w/v) zinc bromide and about 0.1-30% (w/v) zinc chloride, a halogen of about 1-7% (w/v) bromine, and a sequestering agent that is about 7-27% (w/v) of a bromine sequestering agent. More preferably, the electrolyte composition includes a base electrolyte which includes an aqueous solution of about 34-44% (w/v) zinc bromide, about 3-7% (w/v) zinc chloride, a halogen of about 3.75-4.1% (w/v) bromine, and a sequestering agent including about 14-23% (w/v) of the bromine sequestering agent.

Formulation 1

In a first composition, the electrolyte composition includes the base electrolyte described above, an anti-dendrite agent, a buffer, and a metal plating enhancer. Preferably, the electrolyte composition includes the base electrolyte, an anti-dendrite agent of about 0.01-1.5% (w/v) of an alkali salt of sulfopropylated polyalkoxylated beta-naphthol and about 0.001-0.1% (w/v) nicotinic acid, a buffer of about 0.001-0.5% (w/v) sodium benzoate, and a metal plating enhancer of about 0.001-1% (w/v) of 2-ethylhexanol. More preferably, the electrolyte composition includes the base electrolyte, an anti-dendrite agent of about 0.09-0.4% (w/v) of an alkali salt of sulfopropylated polyalkoxylated beta-naphthol and about 0.01-0.07% (w/v) nicotinic acid, a buffer of about 0.01-0.2% (w/v) sodium benzoate, and a metal plating enhancer of about 0.003-0.008% (w/v) of 2-ethylhexanol.

Formulation 2

Formulation 2 is similar to formulation 1, except that formulation 2 does not comprise a buffer. In an alternative embodiment, the electrolyte composition includes the base electrolyte, an anti-dendrite agent, and a metal plating enhancer. Preferably, the electrolyte composition includes the base electrolyte, an anti-dendrite agent of about 0.01-1.5% (w/v) of an alkali salt of sulfopropylated polyalkoxylated beta-naphthol and about 0.001-0.1% (w/v) nicotinic acid, and a metal plating enhancer of about 0.001-1% (w/v) of 2-ethylhexanol. More preferably, the electrolyte composition includes the base electrolyte, an anti-dendrite agent of about 0.09-0.4% (w/v) of an alkali salt of sulfopropylated polyalkoxylated beta-naphthol and about 0.01-0.07% (w/v) nicotinic acid, and a metal plating enhancer of about 0.003-0.008% (w/v) of 2-ethylhexanol.

Formulation 3

In a third exemplary composition, the electrolyte composition includes the base electrolyte, an anti-dendrite agent, a stability enhancer, a metal plating enhancer, a buffer, and a nucleation agent. Preferably, the electrolyte composition includes the base electrolyte, an anti-dendrite agent of about 0.01-5% (w/v) bisphenol A alkoxylate, and about 0.001-0.1% (w/v) nicotinic acid, a stability enhancer of about 0.01-4% (w/v) of a combination of a perfluoroalkyl substituted polyether with a dipropylene glycol monomethyl ether, a metal plating enhancer of about 0.001-1% (w/v) of 2-ethylhexanol, a buffer of about 0.001-0.5% (w/v) sodium benzoate, and a nucleation agent of about 0.001-0.1% (w/v) vanadyl sulfate (VOSO$_4$). More preferably, the electrolyte composition includes the base electrolyte, an anti-dendrite agent of about 0.5-3% (w/v) bisphenol A alkoxylate and about 0.01-0.07% (w/v) nicotinic acid, a stability enhancer of about 0.05-1.5% (w/v) of a combination of a perfluoroalkyl substituted polyether with a dipropylene glycol monomethyl ether, a metal plating enhancer of about 0.003-0.008% (w/v) of 2-ethylhexanol, a buffer of about 0.01-0.2% (w/v) sodium benzoate, and a nucleation agent of about 0.01-0.05% (w/v) (w/v) vanadyl sulfate (VOSO$_4$).

Formulation 4

In a fourth exemplary composition, the electrolyte composition includes the base electrolyte, an anti-dendrite agent, a stability enhancer, and a nucleation agent. In an embodiment, the nucleation agent may also function as a buffer. Preferably, the electrolyte composition includes the base electrolyte, an anti-dendrite agent of about 0.01-5% (w/v) bisphenol A alkoxylate, a stability enhancer of about 0.01-4% (w/v) of a combination of a perfluoroalkyl substituted polyether with a dipropylene glycol monomethyl ether, and a nucleation agent of about 0.001-0.1% (w/v) vanadyl sulfate (VOSO$_4$). More preferably, the electrolyte composition includes the base electrolyte, an anti-dendrite agent of about 0.5-3% (w/v) bisphenol A alkoxylate, a stability enhancer of about 0.05-1.5% (w/v) of a combination of a perfluoroalkyl substituted polyether with a dipropylene glycol monomethyl ether, and a nucleation agent of about 0.01-0.05% (w/v) vanadyl sulfate (VOSO$_4$).

Formulation 5

In a fifth exemplary composition, the electrolyte composition includes the base electrolyte, anti-dendrite agents and an anti-corrosion agent. Preferably, the electrolyte composition includes a mixture of the base electrolyte, an anti-dendrite agent of about 0.01-5% (w/v) bisphenol A alkoxylate, and an anti-corrosion agent of about 0.1-2% (w/v) poly(oxy ether) (e.g., PEG). More preferably, the electrolyte composition includes the base electrolyte, an anti-dendrite agent of about 0.5-3% (w/v) bisphenol A alkoxylate, and an anti-corrosion agent of about 0.05-1.5% (w/v) poly(oxy ether) (e.g., PEG).

In an embodiment, the poly (oxy ether) has a molecular weight of at least 4000. More preferably, the poly (oxy ether) (e.g., PEG) has a molecular weight of about 18,000-25,000. In an embodiment, the PEG functions as both an anti-dendrite agent and an anti-corrosion agent.

Table 1 below illustrates example embodiments of the electrolyte composition. The table illustrates a base formula with five formulations. Each of the five formulations includes the base formula plus the additives listed in the specific formulation. For example formulation 4 includes the base electrolyte or base formula (e.g., 36.9% (w/v) zinc bromide, 4.9% (w/v) zinc chloride, 17.7% (w/v) bromine sequestering agent, 3.8% (w/v) bromine plus Formulation 4 additives (e.g., 1.4% (w/v) bisphenol A alkoxylate, 0.25% (w/v) combination of a perfluoroalkyl substituted polyether with a dipropylene glycol monomethyl ether, 0.033% (w/v) VOSO$_4$). Although certain additives are listed below in each formulation, one skilled in the art would be able to replace certain additives for comparable additives in appropriate proportions (described above) to perform similar functions as those listed in the table below.

TABLE 1

| Formulation | Formula |
| --- | --- |
| Base Formula | 36.9% (w/v) zinc bromide, 4.9% (w/v) zinc chloride, 3.8% (w/v) bromine, 17.7% (w/v) bromine sequestering agent (i.e., 1.64M zinc bromide, 0.36M zinc chloride, 0.24M bromine, 0.8M bromine sequestering agent,) |
| Formulation 1 | 0.2% (w/v) alkali salt of sulfopropylated polyalkoxylated beta-naphthol, 0.08% (w/v) sodium benzoate, 0.04% (w/v) nicotinic acid, 0.005% (w/v) 2-ethylhexanol |
| Formulation 2 | 0.2% (w/v) alkali salt of sulfopropylated polyalkoxylated beta-naphthol, 0.04% (w/v) nicotinic acid, 0.005% (w/v) 2-ethylhexanol |

TABLE 1-continued

| Formulation | Formula |
|---|---|
| Formulation 3 | 1.4% (w/v) bisphenol A alkoxylate, 0.25% (w/v) combination of a perfluoroalkyl substituted polyether with a dipropylene glycol monomethyl ether, 0.08% (w/v) sodium benzoate, 0.04% (w/v) nicotinic acid, 0.005% (w/v) 2-ethylhexanol, 0.033% (w/v) $VOSO_4$ |
| Formulation 4 | 1.4% (w/v) bisphenol A alkoxylate, 0.25% (w/v) combination of a perfluoroalkyl substituted polyether with a dipropylene glycol monomethyl ether, 0.033% (w/v) $VOSO_4$ |
| Formulation 5 | 1.4% (w/v) bisphenol A alkoxylate, 1% (w/v) poly(ethylene oxide) (PEG-20,000) |

A system with the embodiment electrolyte and a method of using the embodiment electrolyte is described below.

Flow Battery System

The embodiment electrolyte formulations described above may be used in any of the flow battery systems such as the non-limiting systems described below resulting in increased energy capacity and energy efficiency of the flow battery system. Moreover, methods of operating the flow battery systems may include any suitable methods, such as the methods described below using the electrolyte compositions described above.

In an embodiment, the flow battery system may include a metal halogen flow battery comprising a plurality of flow battery cells and a liquid electrolyte reservoir fluidly connected to the flow battery, wherein the electrolyte comprises an aqueous solution of a metal-halide a halogen, and at least one of an anti-dendrite agent, an anti-corrosion agent, and a metal plating enhancer.

In an embodiment, the plurality of flow battery cells may include a stack of flow battery cells located in a cell chamber separate from the reservoir, and the cell chamber may be fluidly connected to the reservoir by a plurality of electrolyte conduits.

In an embodiment, each flow battery cell in the stack does not contain a separator in a reaction zone between the cell's anode and cathode electrodes. In an embodiment, the system may further include only the single liquid electrolyte reservoir. In an embodiment, system may include bromine as the halogen and the flow battery may be a zinc-bromine, zinc-chlorine, or zinc-chlorine-bromine flow battery configured to use a liquid electrolyte. In an embodiment, the aqueous solution of the metal-halide may include at least one of zinc bromide, zinc chloride, or a mixture of zinc chloride and zinc bromide. In a further embodiment, the liquid electrolyte may include a sequestering agent, such as a bromine sequestering agent.

Method of Operating the Flow Battery System

In an embodiment, a method of operating a flow battery system may include providing a liquid metal-halide electrolyte between a plurality of flow battery cells and a liquid electrolyte reservoir, wherein the liquid electrolyte comprises an aqueous solution of a metal-halide, a halogen, and at least one of an anti-dendrite agent, an anti-corrosion agent, and a metal plating enhancer.

In an embodiment, the method of operating a flow battery system may further include circulating the electrolyte between a plurality of flow battery cells that include a stack of flow batter cells located in a cell chamber separate from the reservoir and the reservoir through a plurality of electrolyte conduits using at least one pump.

In an embodiment, the method of operating a flow battery system may further include a flow battery where each flow battery cell in the stack does not contain a separator in a reaction zone between the cell's positive and negative electrodes. In an embodiment, the method may further include using a system with only the single liquid electrolyte reservoir. In an embodiment, the method may include the halogen is bromine and the aqueous solution is the metal-halide of at least one of zinc bromide, zinc chloride or a mixture of zinc chloride and zinc bromide. In an embodiment, the method may further include the liquid electrolyte with a sequestering agent, such as a bromine sequestering agent.

Further embodiments of the present invention are drawn to metal-halogen flow battery systems and methods of using these systems with the electrolyte compositions described above. The systems include flow architecture with a single flow circuit. Conventional metal halogen flow batteries maintain electrochemical efficiency by keeping reactant streams contained in two distinct flow loops by using a separator between the positive and negative electrodes of each flow cell and separate reservoirs for the electrolyte and the halogen reactant. The configurations below describe systems and methods for reactant handling that combine the simplicity and reliability of a single flow loop system with reactant separation balance of plant (BOP) components. Preferably, the single flow loop system includes a stack of flow battery cells without a separator between the positive and negative electrodes of each flow cell (i.e., the reaction zone is not partitioned) and a common reservoir for the electrolyte and the concentrated halogen reactant.

The electrochemical (e.g., flow battery) system can include a vessel containing one or more electrochemical cells (e.g., a stack of flow battery cells) in its inner volume, a metal-halide electrolyte, and a flow circuit configured to deliver the metal-halide electrolyte to the electrochemical cell(s). The flow circuit may be a closed loop circuit that is configured to deliver the electrolyte to and from the cell(s). In many embodiments, the loop circuit may be a sealed loop circuit.

Each of the electrochemical cell(s) may comprise a first, fluid permeable electrode, which may serve as a positive electrode, a second, fluid impermeable electrode, which may serve as a negative electrode, and a reaction zone between the electrodes. The first electrode may be a porous electrode or contain at least one porous element. The first electrode may comprise a porous or a permeable carbon, metal or metal oxide electrode. For example, the first electrode may comprise porous carbon foam, a metal mesh or a porous mixed metal oxide coated electrode, such as a porous titanium electrode coated with ruthenium oxide (i.e., ruthenized titanium). In discharge and charge modes, the first electrode may serve as a positive electrode at which the halogen may be reduced into halogen ions. The second electrode may comprise a primary depositable and oxidizable metal, i.e., a metal that may be oxidized to form cations during the discharge mode. For example, the second electrode may comprise a metal that is of the same type as a metal ion in one of the components of the metal halide electrolyte. For example, when the metal halide electrolyte comprises zinc halide, such as zinc chloride or zinc bromide, the second electrode may comprise metallic zinc. Alternatively, the second electrode may comprise another material, such as titanium that is plated with zinc.

Preferably, the reaction zone lacks a separator and the electrolyte circulates through the same flow path (e.g., single loop) without a separation between the electrodes in each cell. In other words, the reaction zone may be such that it does not contain a membrane or a separator between the positive and negative electrodes of the same cell that is impermeable to the halogen ions in the electrolyte. Furthermore, the cell may be a hybrid flow battery cell rather than a redox flow battery cell. Thus, in the hybrid flow battery cell, a metal, such as zinc is plated onto one of the electrodes, the reaction zone lacks an ion exchange membrane which allows ions to pass through it (i.e., there is no ion exchange membrane between the cathode and anode electrodes) and the electrolyte is not separated into a catholyte and anolyte by the ion exchange membrane. The electrolyte is stored in one reservoir rather than in separate catholyte and anolyte reservoirs.

Preferably, the electrochemical system may be reversible, i.e., capable of working in both charge and discharge operation mode. The reversible electrochemical system usually utilizes at least one metal halide in the electrolyte, such that the metal of the metal halide is sufficiently strong and stable in its reduced form to be able to form an electrode. The metal halides that can be used in the reversible system include zinc halides, as element zinc is sufficiently stable to be able to form an electrode. Preferably, the electrolyte is aqueous solution of at least one metal halide electrolyte compound, such as $ZnBr_2$ and/or $ZnCl_2$. For example, the solution may be a 15-50% aqueous solution of $ZnBr_2$ and/or $ZnCl_2$, such as a 25% solution. In certain embodiments, the electrolyte may contain one or more additives, which can enhance the electrical conductivity of the electrolytic solution. For example, when the electrolyte contains $ZnCl_2$, such additive can be one or more salts of sodium or potassium, such as NaCl or KCl. When the electrolyte contains $ZnBr_2$, then the electrolyte may also contain a bromine complexing agent, such as such as a quaternary ammonium bromide (QBr), such as 1-ethyl-1-methyl-morpholinium bromide (MEM), 1-ethyl-1-methylpyrrolidinium bromide (MEP) or Tetra-n-butylammonium bromide (TBA)). Some other examples of bromine complexing agents mentioned above include, 1-dodecyl-1-methylmorpholinium bromide, 1-dodecyl-1-methylpyrrolidinium bromide, 1-dodecylpyridinium bromide, dodecyltrimethylammonium bromide, and benzyldodecyldimethylammonium bromide. In an embodiment, these compounds include any substitution derivatives of the compounds listed (e.g., those containing additional alkyl substituents) as well as different alkyl chain lengths.

FIG. 1 illustrates an electrochemical system 100 which includes a stack of flow battery cells in a sealed container 102. The flow battery cells inside the sealed container 102 are preferably a horizontally positioned cell, which may include a horizontal positive electrode and horizontal negative electrode separated by a gap. For example, element 103 in FIG. 1 represents a vertical stack of horizontally positioned electrochemical cells (i.e., flow cells) connected electrically in series.

As shown in FIG. 1 a feed (e.g., inlet) conduit (e.g., pipe or manifold 115) is configured to deliver the metal-halide electrolyte to the horizontally positioned cells of the stack 103. A return (e.g., outlet) conduit (e.g., pipe or manifold) 120 is configured to collect products of an electrochemical reaction from cells of the stack. The return pipe or manifold 120 may be an upward-flowing return pipe or manifold. The pipe or manifold 120 includes an upward running section 121 and a downward running section 122. The flow of the metal-halide electrolyte and the concentrated halogen reactant leaves the cells of the stack 103 upward through the section 121 and then goes downward to the reservoir through the section 122. As will be discussed in more detail below, in some embodiments, the feed pipe or manifold and/or the return pipe or manifold may be a part of a stack assembly for the stack of the horizontally positioned cells. In some embodiments, the stack 103 may be supported directly by walls of the vessel 102. Yet in some embodiments, the stack 103 may be supported by one or more pipes, pillars or strings connected to walls of the vessel 102 and/or reservoir 119.

The flow battery system may include one or more pumps for pumping the metal-halide electrolyte. Such a pump may or may not be located within the inner volume of the sealed vessel. For example, FIG. 1 shows discharge pump 123, which fluidly connects the reservoir 119 and the feed pipe or manifold 115. The pump 123 is configured to deliver the metal-halide electrolyte through the feed pipe or manifold 115 to the stack of flow battery cell(s) 103. In some embodiments, the flow battery system may include an optional additional pump 124. The pump 124 fluidly connects the return pipe or manifold 120 to the reservoir 119 and can be used to deliver the metal-halide electrolyte through the return pipe or manifold to the stack of cell(s) in charge and/or discharge mode. Alternatively, pump 124 may be omitted and the system may comprise a single flow loop/single pump flow battery system. Any suitable pumps may be used in the system, such as centripetal and/or centrifugal pumps.

The reservoir 119 may contain a feed line 127 for the concentrated halogen reactant, which may supply the halogen reactant to the feed pipe or manifold 115 of the system. As used herein, a "concentrated halogen reactant" includes aqueous electrolyte with higher than stoichiometric halogen content (e.g., higher halogen content than 1:2 zinc to halogen ratio for zinc-halide electrolyte), pure liquid halogen (e.g., liquid chlorine and/or bromine) or chemically-complexed halogen, such as a bromine-MEP or another bromine-organic molecule complex. A connection between the halogen reactant feed line 127 and the feed pipe manifold 115 may occur before, at or after the pump 123. An inlet of the feed line 127 is located in the lower part 126 of the reservoir 119, where the complexed bromine reactant may be stored. An outlet of the feed line 127 is connected to an inlet of the pump 123. The electrolyte intake feed line, such as a pipe or conduit 132, is located in the upper part 125 of the reservoir 119, where the lighter metal-halide electrolyte (e.g., aqueous zinc bromide) is located.

In some embodiments, the electrochemical system may include a controlling element, which may be used, for example, for controlling a rate of the pump(s). Such a controlling element may be an analog circuit. FIG. 1 depicts the controlling element as element 128.

Flow Configurations

Figure 2A:
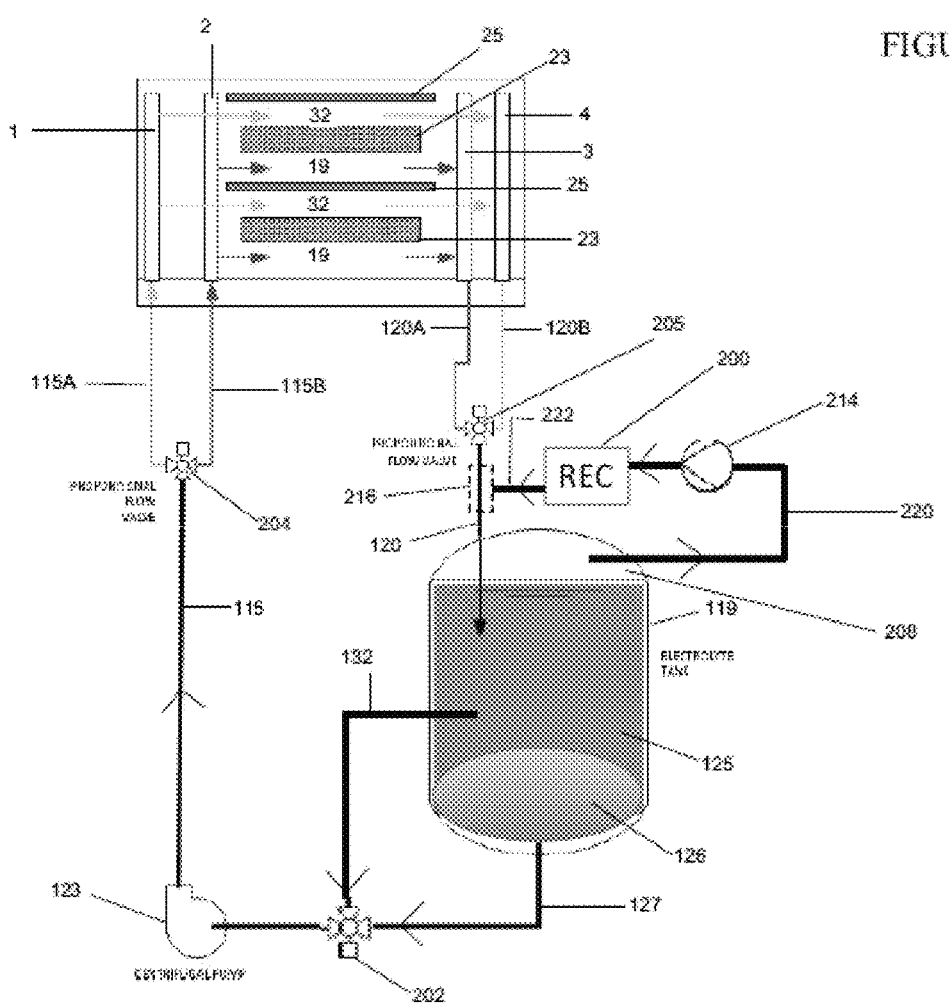
FIG. 2A illustrates a schematic side cross sectional view of flow paths in the embodiment electrochemical system.

FIGS. 2B and 2C schematically illustrate respective charge mode and discharge mode paths for a flow of the metal-halide electrolyte and the halogen reactant through the horizontally positioned cells of the stack, such as the stack 103 of FIGS. 1 and 2A. The electrolyte flow paths in FIGS. 2A-2C are represented by arrows. The reservoir 119 may contain one or more internal liquid portions as well as one or more internal gaseous portions. In this embodiment, the reservoir 119 includes two liquid portions 125 and 126, and one gaseous portion 208. Gaseous species, such as halogen (e.g. $Cl_2$ or $Br_2$) and hydrogen gas, are stored in the upper portion 208 (e.g., head space) of the reservoir 119. The reservoir 119 may also include internal structures or filters (not shown for clarity). A liquid pump (e.g., centrifugal pump 123) may be used to pump the electrolyte from upper liquid portion 125 of the reservoir 119 via conduit 132 which has an inlet in portion 125 of the reservoir. Conduit 127 has an inlet in the lower liquid portion 126 of the reservoir 119 where the majority of the concentrated halogen reactant is located. In charge mode, conduit 127 is closed by valve 202 such no concentrated halogen reactant flows into the stack 103 via conduit 127 during charge mode. In discharge mode, valve 202 is open to allow halogen reactant to flow into the stack 103 via conduit 127.

Each flow battery cell 101 in the stack 103 includes a porous (e.g., fluid permeable) electrode 23 and a non-porous (e.g., fluid impermeable) electrode 25. As described above, the permeable electrode 23 may be made of any suitable material, such as a titanium sponge or mesh. The impermeable electrode 25 may be made of any suitable material, such as titanium. A layer of metal 25A, such as zinc, is plated on the impermeable electrode 25 (e.g., on the bottom surface of electrode 25), as shown in FIGS. 2B and 2C. The reaction zone 32 is located between and separates the impermeable electrode 25/layer of metal 25A and the permeable electrode 23.

FIG. 2B illustrates the flows through the stack 103 of FIG. 2A during charge mode. In the charge mode, aqueous halogen electrolyte is pumped by the pump 123 from the upper liquid portion 125 of the reservoir 119 through conduit 132 into conduit 115. Conduit 115 contains a first flow valve, such as a proportional three way valve 204. Valve 204 may be a computer controlled valve. The valve sends a majority (e.g., 51-100%, such as 60-95%, including 70-90%) of the electrolyte into conduit 115A, and a minority (e.g., 0-49%, such as 5-40%, including 10-30%) of the electrolyte (including no electrolyte) into conduit 115B. Conduit 115A is fluidly connected to the first stack inlet manifold 1 and conduit 115B is fluidly connected to the second stack inlet manifold 2, as will be described in more detail below.

The first stack inlet manifold 1 provides the major portion of the electrolyte to the reaction zone 32 of each cell 101, while the second stack inlet manifold 2 provides a minority of the electrolyte (or no electrolyte) to the space (e.g., one or more flow channels) 19 between the cells 101 located between the permeable electrode 23 of a first cell 101 and an impermeable electrode 25 of an adjacent second cell 101 located below the first cell in the stack 103. The electrodes 23, 25 of adjacent cells may be connected to each other to form a bipolar electrode assembly 50 as will be described in more detail below. Metal, such as zinc, plates on the bottom of the impermeable electrode 25 forming a metal layer 25A in the reaction zone 32. Halogen ions (such as chloride or bromide) in the aqueous electrolyte oxidize to form a diatomic halogen molecule (such as $Cl_2$, $Br_2$) on the permeable electrode 23.

The majority of the electrolyte flows through the reaction zone 32 and exits into first stack outlet manifold 3. The minority of the electrolyte (or no electrolyte) flowing in the flow channel(s) 19 between the cells 101 exits into the second stack outlet manifold 4.

Manifold 3 provides the electrolyte into conduit 120A while manifold 4 provides the electrolyte into conduit 120B. Conduits 120A and 120B converge at a second flow valve, such as a proportional three way valve 205. Valve 205 may be a computer controlled valve. Valve 205 is connected to the outlet conduit 120 and controls the electrolyte flow volume into conduit 120 from conduits 120A and 120B. Conduit 120 provides the electrolyte back into the upper liquid portion 25 of the reservoir 119.

Thus, in the charge mode, the metal halide electrolyte is pumped by pump 123 from the reservoir 119 through an inlet conduit (e.g., one or more of flow pathways 132, 115, 115A, 1) to the reaction zone 32 of each flow cell 101 in the stack 103 in one direction (e.g., left to right in FIG. 2B). A majority of the metal halide electrolyte enters the reaction zone 32 from the inlet conduit (e.g., from manifold 1 portion of the inlet conduit) without first flowing through the permeable electrode 23 in the flow cell 101 or through the flow channel 19 located between adjacent flow cell electrodes 23, 25 in the stack 103. The metal halide electrolyte then flows from the reaction zone 32 of each flow cell in the stack through an outlet conduit (e.g., one or more of flow pathways 3, 120A, 120) to the reservoir 119, such that the majority of the metal halide electrolyte does not pass through the permeable electrode 23 in each flow cell 101 before reaching the outlet conduit (e.g., manifold 3 portion of the outlet conduit).

FIG. 2C illustrates the flows through the stack 103 of FIG. 2A during discharge mode. In discharge mode, valve 202 in conduit 127 is opened, such that the aqueous electrolyte and concentrated halogen reactant (e.g., complexed bromine) are pumped by pump 123 from the respective middle portion 125 and the lower liquid portion 126 of the reservoir 119 to respective conduits 132 and 127.

The electrolyte and the concentrated halogen reactant are provided from respective regions 125 and 126 of the reservoir 119 via conduits 132 and 127. The mixture flows from conduit 115 via valve 204 and conduit 115A and optionally conduit 115B to respective inlet manifolds 1 and 2. As in the charge mode, the majority of the electrolyte and concentrated halogen reactant mixture flows into the inlet manifold 1 and a minority of the mixture (or no mixture) flows into the inlet manifold 2.

The electrolyte and concentrated halogen reactant (e.g., complexed bromine) mixture enters the reaction zone 32 from manifold 1. In other words, the mixture enters the cell reaction zone 32 between the electrodes 23, 25 from the manifold without first passing through the permeable electrode 23. Since the complexed bromine part of the mixture is heavier than the electrolyte, the complexed bromine flows through the permeable electrode 23 at the bottom of each cell 101. In the discharge mode, complexed bromine passing through the permeable electrode 23 is reduced by electrons, resulting in the formation of bromine ions. At the same time, the metal layer 25A on the impermeable electrode 25 is oxidized, resulting in metal (e.g., zinc) ions going into solution in the electrolyte. Bromine ions formed in the discharge step are provided into the flow channel(s) 19 between the cells 101, and are then provided from the flow channel(s) 19 through the second stack outlet manifold 4 into conduit 120B. The electrolyte rich in zinc ions is provided from the reaction zone 32 through the first stack outlet manifold 3 into conduit 120A. The bromine ions in conduit 120B and the zinc rich electrolyte in conduit 120A are mixed in valve 205 and then provided via conduit 120 back to the middle portion 125 of the reservoir.

Thus, in the discharge mode, the mixture of the metal halide electrolyte and the concentrated halogen reactant (e.g., complexed bromine) flows from the reservoir 119 through the inlet conduit (e.g., one or more of flow pathways 132, 115, 115A, 1) to the reaction zone 32 of each flow cell 101 in the stack 103 in the same direction as in the charge mode (e.g., left to right in FIG. 2C). A majority of the mixture enters the reaction zone 32 from the inlet conduit without first flowing through the permeable electrode 23 in the flow cells 101 or through the flow channel 19 located between adjacent flow cell 101 electrodes 23, 25 in the stack 103. The mixture then flows from the reaction zone 32 of each flow cell 101 in the stack 103 through the outlet conduit (e.g., one or more of flow pathways 3, 120A, 120) to the reservoir 119, such that a majority of the mixture passes through the permeable electrode 23 in each flow cell 101 before reaching the outlet conduit (e.g., the manifold 3 portion of the outlet conduit).

Thus, in charge mode, the majority of the flow is "flow-by" (e.g., the majority of the liquid flows by the permeable electrode through the reaction zone), while in discharge mode, the majority of the flow is "flow-through" (e.g., the majority of the liquid flows through the permeable electrode from the reaction zone) due to the difference in the reaction kinetics in charge and discharge modes.

In an example of a zinc-bromide flow battery, during charge mode, an electron is accepted in a reduction process (e.g., $Zn^{2+}+2e^{-} \rightarrow Zn$) at the negative (e.g., non-porous) electrode of each cell, while electrons are given away in an oxidation process (e.g., $Br^{-} \rightarrow Br_2+2e^{-}$) at the positive (e.g., porous) electrode. The process is reversed during the discharge mode. In this example, the electrolyte may be aqueous zinc bromide while the concentrated halogen may be liquid bromine, a bromine complex (e.g., a bromine-MEP complex) or a mixture thereof with the aqueous zinc bromide.

Valves 204 and/or 205 may be used control the ratio of liquid flow rate between the two inlet paths (e.g., 115A/115B) and/or between the two outlet paths (e.g., 120A/120B). Thus, the net amount of liquid that flows through the permeable electrode 23 may be controlled in charge and/or discharge mode. For example, in charge mode, the valve 205 may be adjusted to provide a higher liquid flow rate through manifold 3 and conduit 120A and a lower liquid flow rate through manifold 4 and conduit 120B to favor the "flow-by" flow configuration. In contrast, in discharge mode, the valve 205 may be adjusted to provide a lower liquid flow rate through manifold 3 and conduit 120A and a higher liquid flow rate through manifold 4 and conduit 120B compared to the charge mode to favor the "flow-through" flow configuration.

In charge mode, the majority of the flow is "flow-by" because this is preferable for the metal plating reaction and sufficient for the halogen oxidation reaction. For the metal plating reaction, it is important to maintain an adequate concentration of metal ions (e.g. $Zn^{2+}$) near the surface of the impermeable electrode 25 onto which the metal layer 25A will be plated. Insufficient flow speed at the exit end of the plating area (which might occur in the "flow-through" arrangement used during discharge) could lead to metal ion starvation and poor plating morphology, particularly at high stack open current when the bulk concentration of metal ions is at its lowest. The halogen oxidation reaction that takes place on the permeable electrode 23 (e.g. bromide ions oxidized to bromine) in the charge mode can be adequately supplied with reactants in either a "flow-by" or a "flow-through" arrangement.

In contrast, in the discharge mode, the majority of the flow is "flow-through" because this is sufficient for the metal layer 25A de-plating reaction and preferable for the halogen reduction reaction. The reactant in the metal de-plating reaction (i.e., zinc layer 25A) is already available along the entire surface of the impermeable electrode 25, where it was plated during the charge mode. As a result, both "flow-by" and "flow-through" are adequate to support this reaction. For the halogen reduction reaction (e.g. bromine reducing to bromide ions), it is important to supply an adequate concentration of halogen to the active surface of the permeable electrode 23. The molecular halogen is not as mobile as its ionic counterpart, particular if a complexing agent is used, so much more surface area and reactant flow rate is needed to support the halogen reduction reaction than the halogen oxidation reaction. Flowing through the permeable electrode 23 achieves this reactant supply requirement.

Thus, charge and discharge inlet flows no longer need to flow on opposite sides of the cell frame and/or in opposite directions. Rather, the same first stack inlet manifold 1 and the same pump 123 may be used to supply the majority of the flow to the reaction zone 32 during both charge and discharge modes. Thus, the majority of the liquid in both the charge and discharge mode flows in the same direction through the reaction zone in both modes and the majority of the liquid in both the charge and discharge mode enters the reaction zone 32 directly from the inlet manifold 1 without first flowing through the permeable electrode 23 or the flow channel(s) 19 between the cells 101. Thus, manifold 1 may be referred to as the "main inlet manifold."

If desirable, the second stack inlet manifold 2 may be used to supply a minority of the flow through the flow channel(s) 19 between the opposite electrodes 23, 25 of adjacent flow cells 101 to the bottom side of the permeable electrode 23 (i.e., the side of electrode 23 facing the flow channel(s) 19) during charge and/or discharge modes. These charge mode electrolyte purge flow and/or discharge mode electrolyte—complexed bromine mixture purge flow may be useful to prevent bubbles or denser complex phase liquid from accumulating beneath the permeable electrode 23 in the flow channel(s). Thus, the second stack inlet manifold may be referred to as the "secondary inlet manifold" or the "purge inlet manifold". The purge flows flow from the channel(s) 19 to the second stack outlet manifold 4. Alternatively, the second stack inlet manifold 2 and conduit 115B may be omitted to simplify the overall system design.

The flow battery system of FIG. 2A may also include an optional recombinator 200 and a gas pump 214. The recombinator is a chamber containing a catalyst which promotes or catalyzes recombination of hydrogen and halogen, such as bromine. The gas pump 214 provides halogen and hydrogen gas from the upper portion 208 of the reservoir 119 via conduit 220 to the recombinator 200. The hydrogen and halogen gases react with each other in the recombinator 200 to form a hydrogen-halogen compound. The hydrogen-halogen compound is then returned to the middle portion (e.g., upper liquid portion) 125 of the reservoir 119 from the recombinator 200 via conduits 222 and 120 by the action of the pump 214.

In another embodiment, the pump 214 is replaced with a venturi injector 216, as shown in FIG. 2A. Thus, the system preferably contains either the pump 214 or the venturi 216, but in some embodiments the system may contain both of them. Thus, the venturi is shown with dashed lines. The hydrogen-halogen compound is drawn from the recombinator 200 into conduit 222 which merges into the venturi injector. The hydrogen-halogen compound mixes with the electrolyte flow being returned from the stack 103 to the reservoir 119 in the venturi injector 206 and the mixture is returned to the reservoir 119 via the return conduit 120.

Figure 3A:
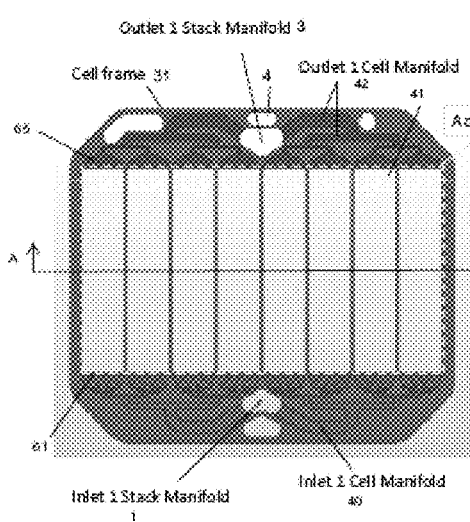
FIG. 3A is a plan view of an upper side of a cell frame for holding the horizontally positioned cells illustrated in FIGS. 2A-2C.
Figure 3B:
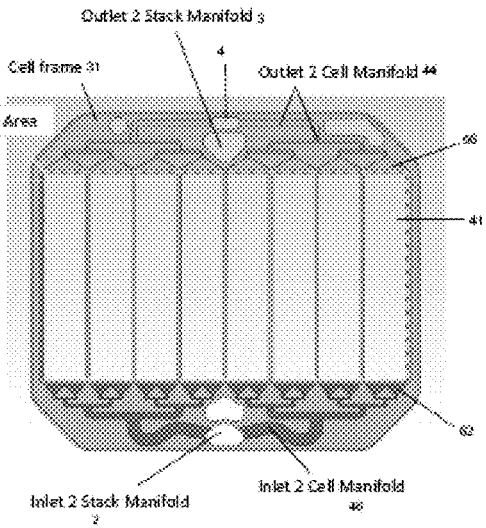
FIG. 3B is a plan view of a lower side of the cell frame illustrated in FIG. 3A.

FIGS. 3A and 3B illustrate the features of the top and bottom surfaces, respectively, of a cell frame 31 for holding the horizontally positioned flow battery cells illustrated in FIGS. 1 and 2A-2C. The frame 31 includes the main inlet manifold 1, the secondary inlet manifold 2 and the outlet manifolds 3, 4 described above. The manifolds 1-4 are respective openings through the frame 31 which align with similar openings in other stacked frames 31 to form the manifolds. Thus, the inlet manifolds 1, 2 are formed by aligned inlet manifold openings in the stack of cell frames while the outlet manifolds are formed by aligned outlet manifold openings in the stack of cell frames. The frames also include at least one inlet distribution (e.g., flow) channel and at least one outlet distribution channel. For example, as shown in FIGS. 3A and 3B, the upper and lower surfaces of the frame 31 each contain one inlet distribution channel (e.g., 40 on the upper side and 46 on the lower side) and one outlet distribution channel (e.g., 42 on the upper side and 44 on the lower side). These channels 40-46 comprise grooves in the respective surface of the frame 31. The distribution (e.g., flow) channels 40, 42, 44, 46 are connected to the active area 41 (e.g., opening in middle of frame 31 containing the electrodes 23, 25) and to a respective stack inlet or outlet manifold 1, 3, 4 and 2. The inlet distribution channels 40, 46 are configured to introduce the electrolyte from the respective stack inlet manifold 1, 2 to the reaction zone 32 or the flow channel(s) 19, and the outlet distribution channels 42, 44 are configured to introduce the electrolyte from the reaction zone 32 or the flow channel(s) to the respective outlet manifold 3, 4. Since the distribution/flow channels 40-46 deliver the electrolyte to and from each cell, they may also be referred to as the cell manifolds.

The electrolyte flows from the main inlet manifold 1 through inlet flow channels 40 and inlet 61 in the frame 31 to the flow cells 101. As illustrated in FIG. 3A, only the main inlet manifold 1 is fluidly connected to the inlet channels 40 on the top of the frame 31. In the embodiment illustrated in FIG. 3A, the charge mode inlet manifold 1 connects to two flow channels 40 which successively divide into subchannels (i.e., flow splitting nodes where each channel is split into two subchannels two or more times) to provide a more even and laminar electrolyte flow to the electrodes 23, 25. After passing across the electrodes 23, 25, the electrolyte exits the cells from outlet 65 into exit flow channels 42 on an opposite end or side of the frame 31 from the main inlet manifold 1. The electrolyte empties from the exit (i.e., outlet) flow channels 42 to a first stack outlet manifold 3. Exit channels 42 may also comprise flow splitting nodes/subchannels as shown in FIG. 3A.

As illustrated in FIG. 3B, on the bottom side of the cell frame 31, the second inlet manifold 2 is connected to bottom purge inlet channels 46 while the main manifold 1 is fluidly isolated from the purge inlet channels 46. While the secondary inlet manifold 2 is shown as being located closer to the edge of the frame 31 than the main manifold 1 in FIGS. 3A and 3B, the positions of the manifolds 1 and 2 may be reversed. Thus, manifold 1 may be located closer to the frame 31 edge than manifold 2, as shown in FIG. 2A or the manifolds 1, 2 may be located side by side, as shown in FIG. 4. The second stack outlet manifold 4 is connected to the electrochemical cells via outlet 66 and bottom exit channels 44 on the bottom surface of the frame 31.

FIGS. 3C and 3D illustrate the flows through the manifolds in the stack of cell frames 31. The stack of cell frames 31 supports the stack 103 of cells 101. The stack of cell frames 31 is preferably a vertical stack in which adjacent cell frames are separated in the vertical direction.

As shown in FIG. 3C, the majority of the liquid flow in the charge and discharge mode flows upward through the main inlet manifold 1 in the frames 31. The flow exits the manifold 1 in each frame to two flow channels 40 which successively divide into subchannels (i.e., flow splitting nodes where each channel is split into two subchannels two or more times). The flow then flows from subchannels 40 through outlet 61 into the reaction zone 32 of each cell. After passing through the reaction zone between the electrodes 23, 25 of each cell 101, the flow exits the cells from outlet 65 into exit flow channels 42 on an opposite end or side of the frame 31 from the main inlet manifold 1. The flow empties from the exit flow channels 42 to the first stack outlet manifold 3. As described above, in discharge mode, a portion of the flow passes through the permeable electrode 23 into the flow channel(s) 19. After passing through the flow channel(s) 19, the flow is provided through outlet 66 into exit flow channels 44. The flow empties from the exit flow channels 44 to the second stack outlet manifold 4.

As shown in FIG. 3D, the minority of the liquid flow (e.g., the purge flow) flows in the charge and discharge mode flows upward through the secondary inlet manifold 2 in the frames 31. The flow exits the manifold 2 in each frame to two flow channels 46 which successively divide into subchannels (i.e., flow splitting nodes where each channel is split into two subchannels two or more times). The flow then flows from subchannels 46 through outlet 62 into the flow channel(s) 19 between each cell 101. After passing through the flow channel(s) 19, the flow is provided through outlet 66 into exit flow channels 44. The flow empties from the exit flow channels 44 to the second stack outlet manifold 4.

As described above with respect to FIGS. 2B and 2C, in charge mode, the purge flow passes through outlets 66 channels 44 to manifold 4. In discharge mode, the majority of the flow passes through the permeable electrode 23 into channel(s) 19 and then through outlet 66 into exit channels 44 and then into manifold 4. Thus, the purge flow may be omitted in discharge mode by adjusting valve 204 to close line 115B.

FIG. 3E illustrates a cross section of an embodiment of a stack of electrochemical cells in a stack of frames through the line A'-A' in FIG. 3A. The cross section A'-A' is transverse to the flow of electrolyte in the electrochemical cell from inlet manifolds 1, 2 to outlet manifolds 3, 4. In this embodiment, the frame 31 includes ledges 33 on which the non-permeable (negative) metal electrode 25 is seated. Additionally, the non-permeable electrode 25 of a first electrochemical cell 101a is spaced apart from and connected to the permeable (positive) electrode 23 of an adjacent, overlying electrochemical cell 101b by one or more electrically conductive spacers 18, such as metal or carbon spacers. An electrolyte flow channel 19 is thereby formed between the non-permeable electrode 25 of the first electrochemical cell 101a and the overlying permeable electrode 23 of an adjacent electrochemical cell 101b. Further, if plural conductive spacers 18 are used, then the spacers divide the electrolyte flow path 18 into a series of flow channels 19.

In an embodiment, the electrodes 23, 25 of adjacent electrochemical cells 101 are provided as an assembly 50. In this embodiment, the non-permeable electrode 25 of a first electrochemical cell 101a, the conductive spacers 18 separated by channels 19 and the porous electrode 23 of the adjacent electrochemical cell 101b are assembled as a single unit. The individual components may be glued, bolted, clamped, brazed, soldered or otherwise joined together. The fabrication of an electrode assembly 50 simplifies and speeds the assembly of stacked flow cell device. Each electrode assembly is placed into a respective frame 31, such that one electrode (e.g., the larger non-permeable electrode 25) is supported by the ledges 33 in the frame 31, and the other electrode (e.g., the smaller non-permeable electrode 23) is supported in the space 41 between the ledges 33 by the spacers 18 from the underlying non-permeable electrode 25. Of course the order of the electrodes may be reversed and the porous electrode may be supported by the ledges 33. Other electrode attachment configurations, such as bolting or clamping to the frame, may be used. The frames 31 with the electrodes 23, 25 are stacked upon each other to form the stack 103 of cells. As each frame is stacked, a new cell 101 is created with a reaction zone 32 in between the bottom electrode 23 and a top electrode 25 of each cell. As seen in FIGS. 2A-2C, the electrodes 23, 25 of the same cell (e.g., 101a) are separated by the reaction zone 32 and do not physically or electrically contact each other and comprise a portion of separate electrode assemblies.

As described above, the flow battery system illustrated in FIGS. 1-3E contains two types of flow manifolds: stack manifolds 1, 2, 3 and 4 which are common flow paths that feed individual cell flow paths, and cell manifolds 40, 42, 44 and 46 which are flow paths that distribute flow from (or to) the stack manifold to (or from) the entire width of the active area in an individual flow cell. Preferably, as described above and illustrated in FIGS. 3A and 3B, the stack manifolds (e.g., aligned holes in a stack of cell frames 31) and cell manifolds (e.g., grooves in the cell frames 31) are formed directly into the cell frames 31 that house and align the electrodes in a stack assembly. This eliminates the cost and complexity associated with external manifold plumbing (e.g., large tube feeding multiple small tubes) found in prior art flow batteries. Additionally, the integration of the stack and cell manifolds into the cell frame ensures that the stack and cell manifolds are fully contained within the primary stack sealing envelope shown in FIG. 12. As a result, the flow channel seals are not integral to the seal between the stack and the vessel 102, reducing the overall leak risk.

Figure 4A:
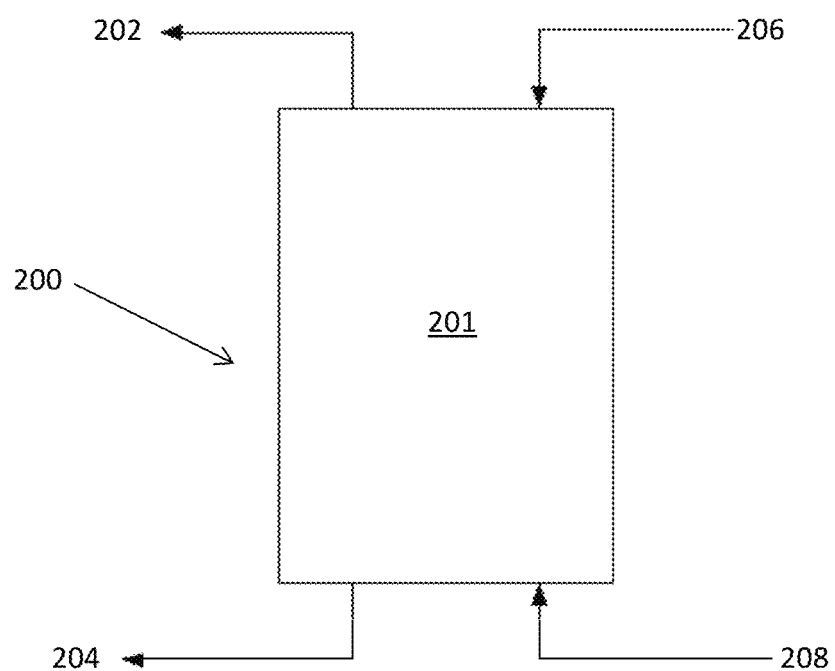
FIG. 4A is a schematic illustration of a reservoir and balance of plant portion of a flow battery system according to an embodiment.

The flow battery system also includes and electrolyte reservoir 200 illustrated in FIG. 4A. An embodiment of the electrolyte reservoir 200 includes a vessel 201 (e.g., tank or other suitable fluid container) with two outlets (also referred to as stack feed lines) 202, 204 and two inlets (also referred to as reservoir return lines from the stack) 206, 208. The outlets 102, 104 and inlets 106, 108 may each be an opening and/or a conduit (e.g., pipe or manifold line) leading from the reservoir 200 to stack 100 and from the stack 100 back to reservoir, respectively. There are separate aqueous electrolyte and concentrated halogen suction feed lines 202, 204 to allow access to regions within the reservoir of varying fluidic composition (e.g., upper lighter electrolyte and lower heavier concentrated halogen regions). There are separate aqueous electrolyte and concentrated halogen return lines 206, 208 to allow for separate return streams to be provided to different portions within the reservoir.

Figure 4B:
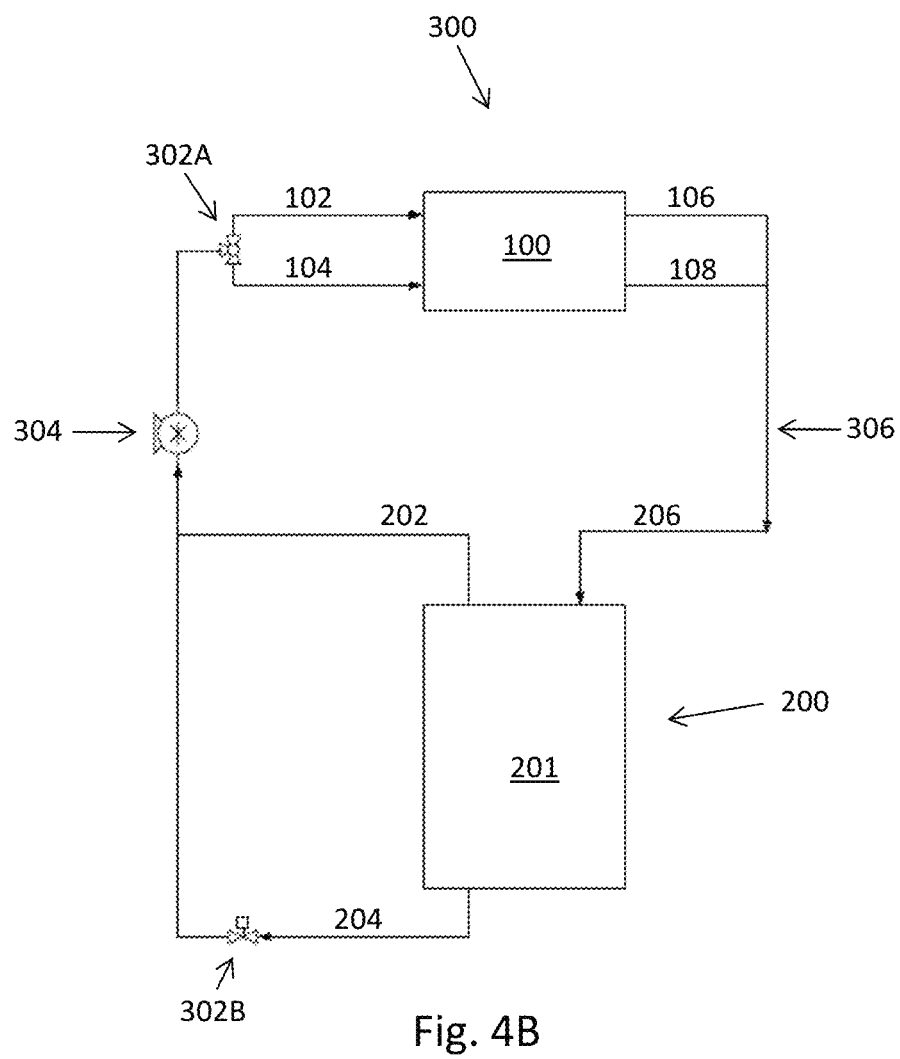
FIG. 4B is schematic illustration of a balance of plant plumbing configuration of the flow battery system according to an embodiment.

An embodiment of a metal-halogen flow battery system 300 illustrating an embodiment of a balance of plant (BOP) plumbing configuration is shown in FIG. 4B. In charge mode, aqueous electrolyte is pumped from reservoir 200 by pump 304 through line 202. An actuated valve 302A can distribute the electrolyte flow to the charge inlet 102 and/or discharge inlet 104 of the cell stack 100 in charge mode. Preferably, the majority or all of the electrolyte is provided to the stack through inlet 102 through valve 302A. In charge mode, valve 302B in line 204 is closed so that the concentrated halogen is not provided from the reservoir 200 into stack 100 through line 204. The common and bypass exits 106, 108 of the cell stack 100 are joined to a common return line 306 which is connected to the aqueous electrolyte return 206 of the reservoir 200. Preferably, the exits 106, 108 are joined to the common return line 306 outside the stack 100. For example, exits 106, 108 may be conduits which separately extend outside the stack enclosure or frame before merging into a common conduit 306. The concentrated halogen return line 208 of the reservoir 200 is omitted in this embodiment. Thus, all electrolyte flows from the stack through line 306 to the reservoir.

In discharge mode, the actuated valve 302B on the concentrated halogen feed line (i.e., suction pathway) 204 is opened which allows the main system pump 304 to provide simultaneous suction of aqueous electrolyte from the upper part of the vessel 201 via line 202a and of the concentrated halogen reactant from the lower part of the vessel 201 via line 204. This high halogen-content fluid is provided to the cell stack 100 through valve 302A and inlet 104. The electrolyte outlet flow from the stack 100 into the reservoir 200 in discharge mode is the same as in the charge mode in this embodiment.

Figure 4C:
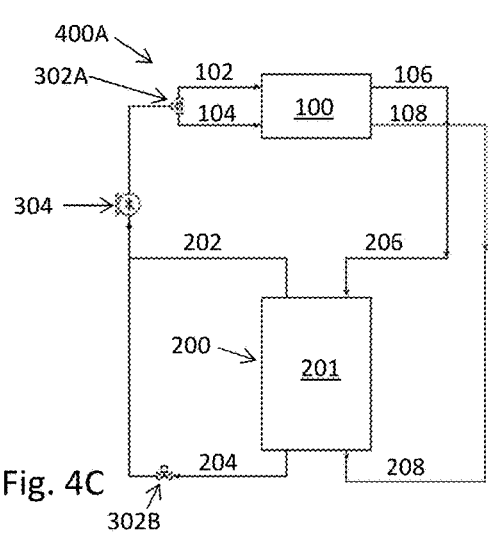
FIG. 4C is a schematic illustration of a balance of plant plumbing configuration of a system according to an embodiment in which the bypass exit of the cell stack is ported directly to the concentrated halogen return of the electrolyte reservoir.

FIGS. 4C-4G illustrate embodiments of metal-halogen flow battery systems 400A-400E with different BOP configuration features that may be used singly or in any combination to reduce the concentrated halogen content of circulating electrolyte. FIG. 4C shows a BOP in which the bypass exit 108 of the cell stack 100 is ported directly to the concentrated halogen return line 208 of the electrolyte reservoir 200, while the common exit 106 is connected to the aqueous electrolyte return 206.

Figure 4D:
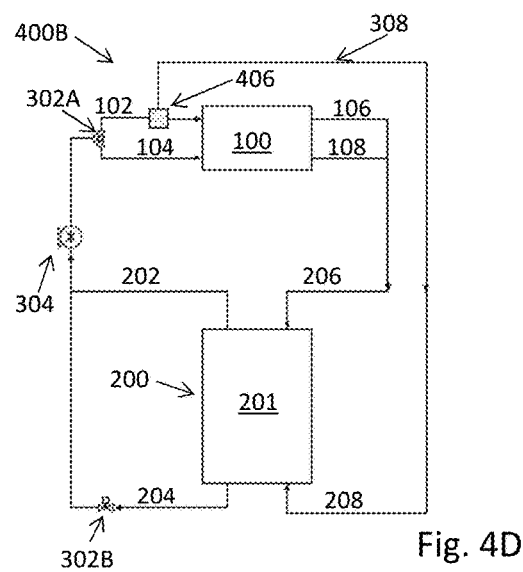
FIG. 4D is a schematic illustration of a balance of plant plumbing configuration of a system according to an embodiment in which where a fine filter is placed on the battery cell stack charge inlet.

FIG. 4D shows a configuration where a fine filter 406, such as a hydrocyclone, coalescer, or other device that separates suspensions based on physiochemical differences, is placed on the battery cell stack charge mode inlet 102. The filter 406 reduces the concentrated halogen content of the electrolyte entering the charge mode inlet 102 and provides a concentrated halogen stream that bypasses the battery cell stack 100 via a bypass channel 308 and is ported directly to the concentrated halogen return 208 of the reservoir 200.

Figure 4E:
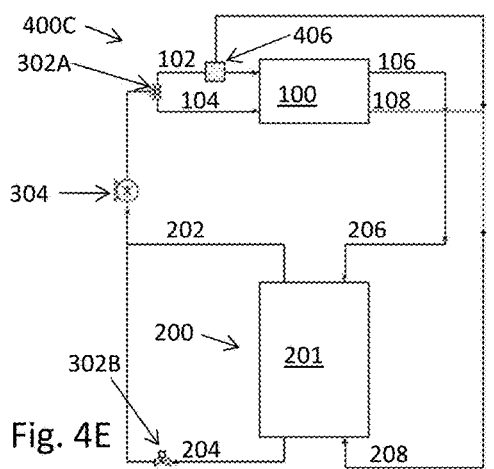
FIG. 4E is a schematic illustration of a balance of plant plumbing configuration of a system according to an embodiment in which the bypass exit and the output of a charge inlet fine filter are both ported to the concentrated halogen return of the reservoir.

FIG. 4E illustrates an embodiment that includes a combination of the features of the embodiments illustrated in FIGS. 4C and 4D. In this embodiment, the bypass exit 108 and the output of a charge inlet fine filter 406 are both ported to the concentrated halogen return 208 of the reservoir 200.

Figure 4F:
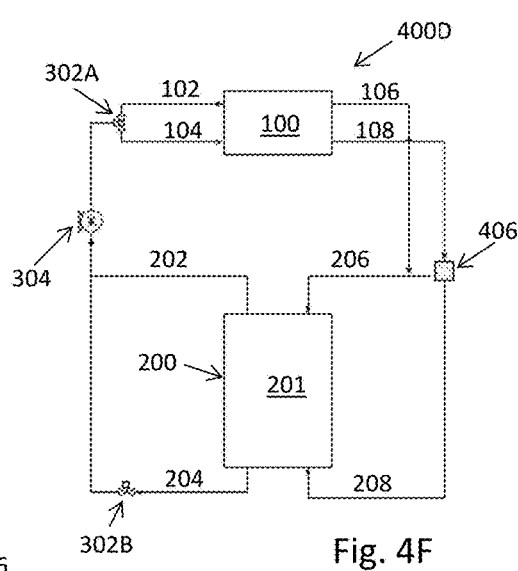
FIG. 4F is a schematic illustration of a balance of plant plumbing configuration of a system according to an embodiment in which a fine filter is placed on the bypass exit.

FIG. 4F illustrates an embodiment in which a fine filter 406 is placed on the bypass exit 108. The filter 406 provides a concentrated halogen stream that can be ported to the concentrated halogen return 208 of the reservoir 200 and an aqueous electrolyte stream that may be ported to the aqueous electrolyte return 206 of the reservoir 200.

Figure 4G:
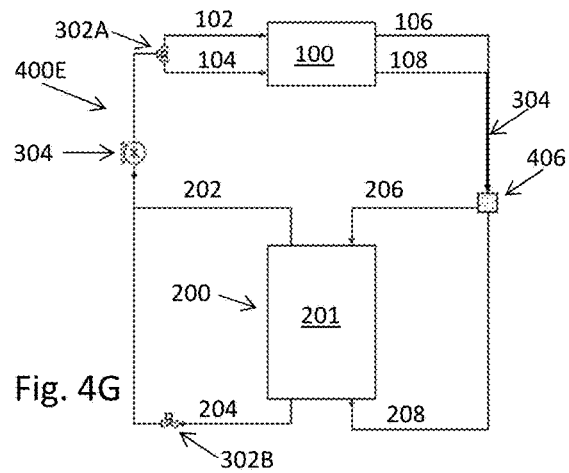
FIG. 4G is a schematic illustration of a balance of plant plumbing configuration of a system according to an embodiment in which a fine filter is placed on the joined common and bypass exits of the flow battery cell stack.

FIG. 4G illustrates an embodiment in which a fine filter 406 is placed on the joined common and bypass exits 306 of the cell stack 100 of FIG. 4B. The filter 406 provides a concentrated halogen stream that can be ported to the concentrated halogen return 208 of the reservoir 200 and an aqueous electrolyte stream that may be ported to the aqueous electrolyte return 206 of the reservoir 200.

Figure 5A:
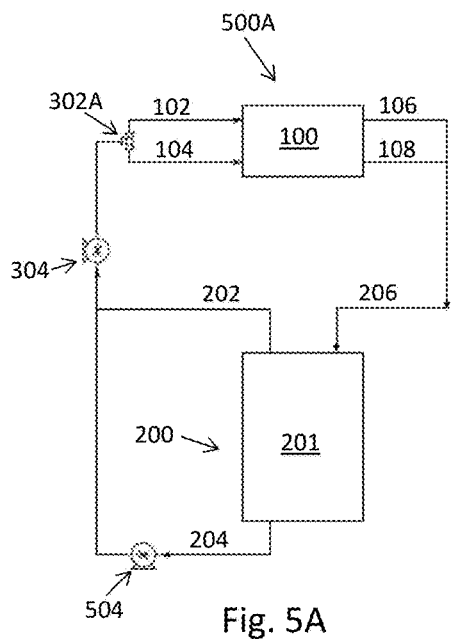
FIG. 5A is a schematic illustration of a balance of plant plumbing configuration of a system according to an embodiment in which an additional pump is added to introduce concentrated halogen to the cell stack instead of direct suction by the main system pump.

FIGS. 5A-5F illustrate embodiments of metal-halogen flow battery system 500A-500F with different BOP configuration features that allow for the introduction and remixing of concentrated halogen reactant with the aqueous electrolyte during battery discharge mode. As illustrated, these embodiments are based on FIG. 4B, but they can be used in concert with any of the BOP configurations features shown in FIGS. 4C-4G. FIG. 5A provides a metal-halogen flow battery system 500A similar to FIG. 3, but uses a second pump 504 to introduce concentrated halogen to stack 100 in discharge mode instead of direct suction by the main system pump 304. Pump 504 is located on the concentrated halogen feed line 204. Thus, in this embodiment, valve 302B may be omitted because the pump 504 performs the valving function by turning on in discharge mode and off in charge mode.

Figure 5B:
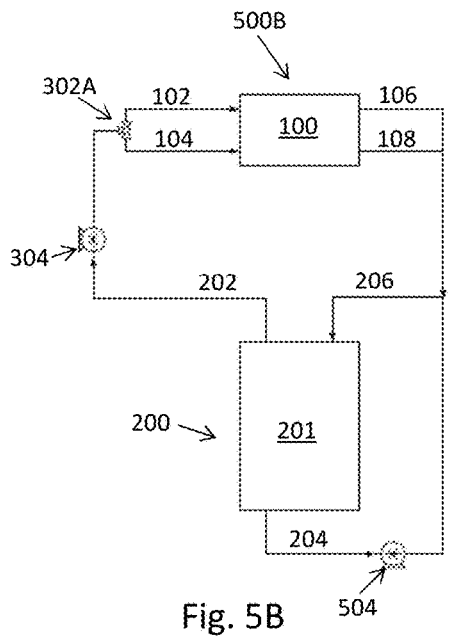
FIG. 5B is a schematic illustration of a balance of plant plumbing configuration of a system according to an embodiment in which concentrated halogen is pumped to the aqueous electrolyte return, creating a mixture of concentrated halogen reactant and aqueous electrolyte within the reservoir.

In the metal-halogen flow battery system 500B illustrated in FIG. 5B, the pump 504 is also located on line 204. However, in this embodiment, line 204 connects to the common return line 306 instead of to the main pump 304 and valve 302A. The concentrated halogen is pumped to the aqueous electrolyte return 206, creating a mixture of concentrated halogen reactant and aqueous electrolyte within the reservoir 200. This halogen-enriched fluid may be used in discharge mode when the main pump 304 suctions the fluid from the upper part of the vessel 201 into line 202.

Figure 5C:
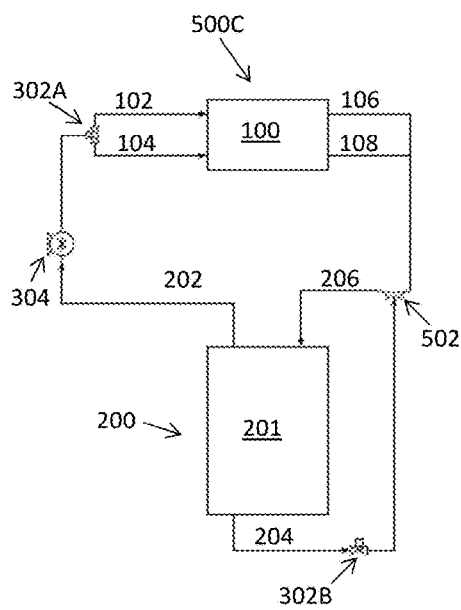
FIG. 5C is a schematic illustration of a balance of plant plumbing configuration of a system according to an embodiment in which a Venturi injector is used to move fluid from the concentrated halogen suction to the aqueous electrolyte return.

The metal-halogen flow battery system 500C illustrated in FIG. 5C is similar to the metal-halogen flow battery system 500B illustrated in FIG. 5B, but it uses a Venturi injector 502 to move fluid from the concentrated halogen suction outlet 204 to the aqueous electrolyte return 206. An actuated valve 302B may be placed on the concentrated halogen suction outlet 204 to allow concentrated halogen flow only during discharge mode but not in charge.

Figure 5D:
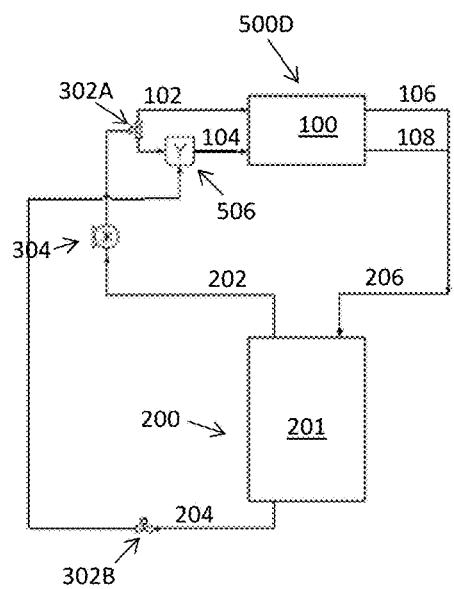
FIG. 5D is a schematic illustration of a balance of plant plumbing configuration of a system according to an embodiment in which the concentrated halogen injection point is moved to the discharge inlet.

The metal-halogen flow battery system 500D illustrated in FIG. 5D moves the concentrated halogen injection point to the discharge mode inlet 104. The concentrated halogen may be either pumped or suctioned using a Venturi injector in discharge mode through the open actuated valve 302B. A physical mixing device 506, such as a nozzle, static mixer, ultrasonic emulsifier, etc., may be located between the concentrated halogen injection point and the battery cell stack 100 to disperse the injected fluid into the bulk electrolyte flow in inlet 104.

Figure 5E:
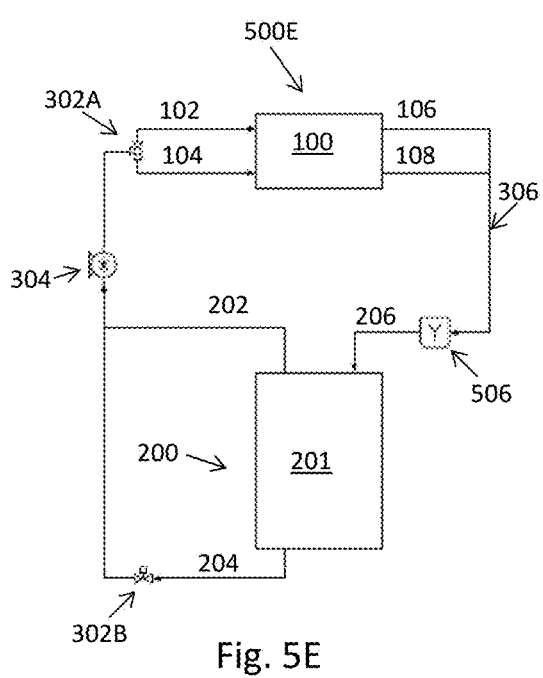
FIG. 5E is a schematic illustration of a balance of plant plumbing configuration of a system according to an embodiment in which a mixing is placed on the joined exits of the battery cell stack.

FIG. 5E shows an embodiment of a metal-halogen flow battery system 500E with a mixing device 506, such as a nozzle, static mixer, ultrasonic emulsifier, etc., placed on the joined exit 306 of the battery cell stack. This mixer helps to homogenize the suspension of electrolyte and concentrated halogen reactant leaving the battery cell stack 100 via exits 106, 108, creating a better discharge fluid in the reservoir 200.

Figure 5F:
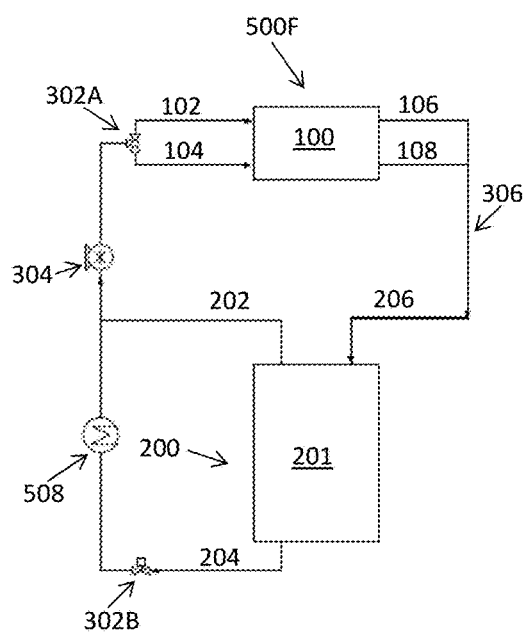
FIG. 5F is a schematic illustration of a balance of plant plumbing configuration of a system according to an embodiment in which an inline heater element is located on the concentrated halogen injection line.

FIG. 5F illustrates an embodiment of a metal-halogen flow battery system 500F with an inline heater element 508 on the concentrated halogen feed line 204. Heating the concentrated halogen flow stream alters the physical and chemical properties of the concentrated halogen flow stream and may facilitate mixing. Heating the concentrated halogen flow stream may also make more halogen available for the discharge reaction in the battery cell stack 100. An inline heater 508 could also be added to any of the embodiments illustrated in FIGS. 5A-5E.

FIGS. 6A-6D schematically illustrate alternative flow paths for a flow of the metal-halide electrolyte and the halogen reactant through the horizontally positioned cells of a stack, such as the stack 103 of FIGS. 1 and 2A. The electrolyte flow paths in FIGS. 6A-6D are represented by arrows. For brevity, and in order to allow comparison with the electrolyte flow paths previously discussed, components illustrated in and discussed above with respect to FIGS. 2A-2C, are identified in FIGS. 6A-6D with the same reference numerals.

Figure 6A:
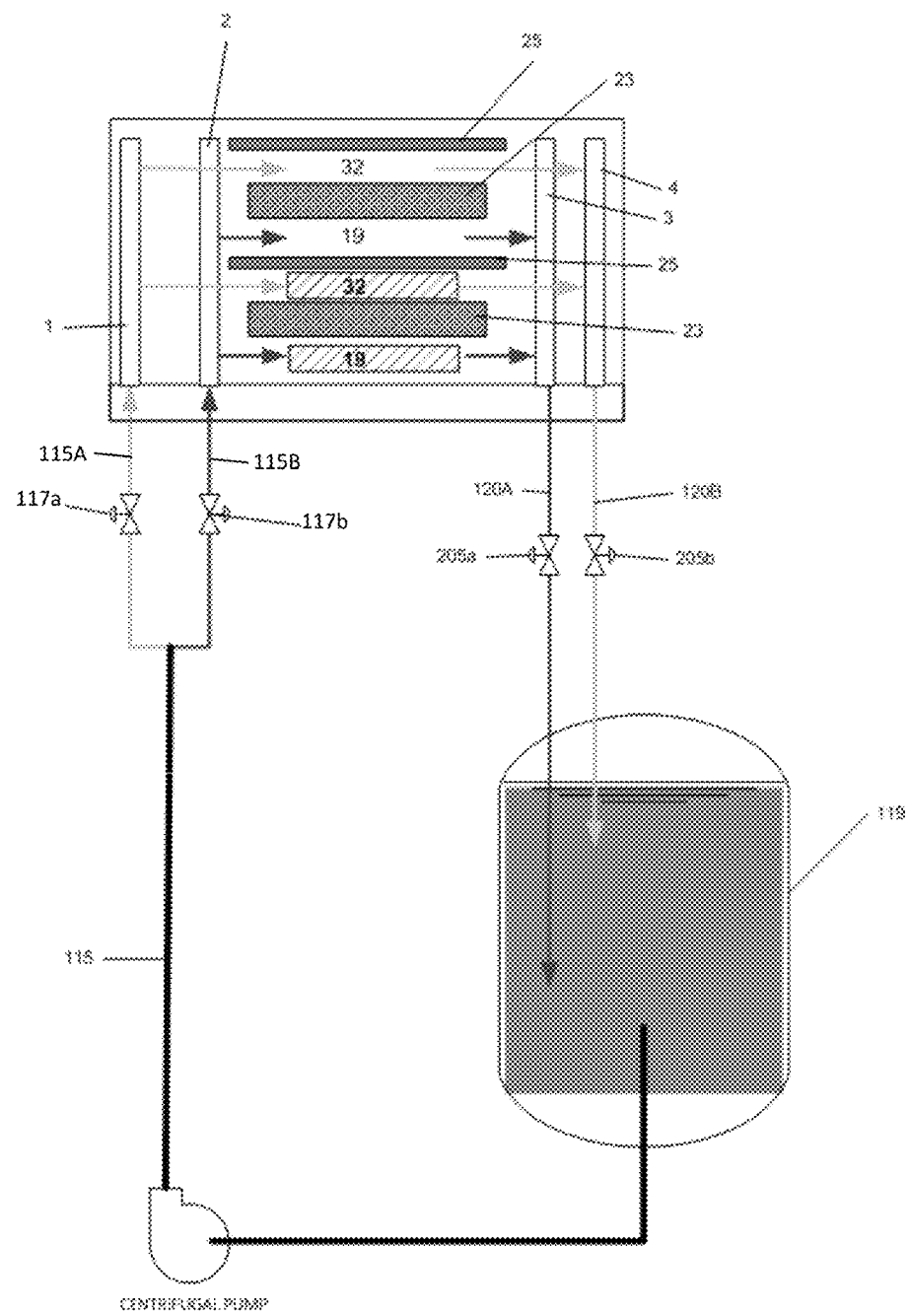
FIG. 6A illustrates a schematic side cross sectional view of flow paths in an alternative embodiment electrochemical system.

In an alternative embodiment shown in FIG. 6A, manifold 3 provides the electrolyte into conduit 120A while manifold 4 provides the electrolyte into conduit 120B. Conduits 120A and 120B separately provide outlet (i.e., exit) flow streams to the reservoir 119, and have separate flow control valves 205a and 205b, respectively (instead of the three way valve 205 in FIG. 2A). In this manner, the tendency of the complex halogen to settle out and collect in the discharge exit path in conduit 120A may be avoided. That is, preserving the concentrated stream of complex halogen and returning it to a separate location may enable easier storage and management of the complex phase. Also, to control the flow ratios of the main inlet line and purge inlet line, conduits 115A and 115B may be configured with control flow valves 117a and 117b, respectively. If the majority of the flow enters the main inlet conduit 115A in all operational modes, then flow control valve 117a may be eliminated.

Figure 6B:
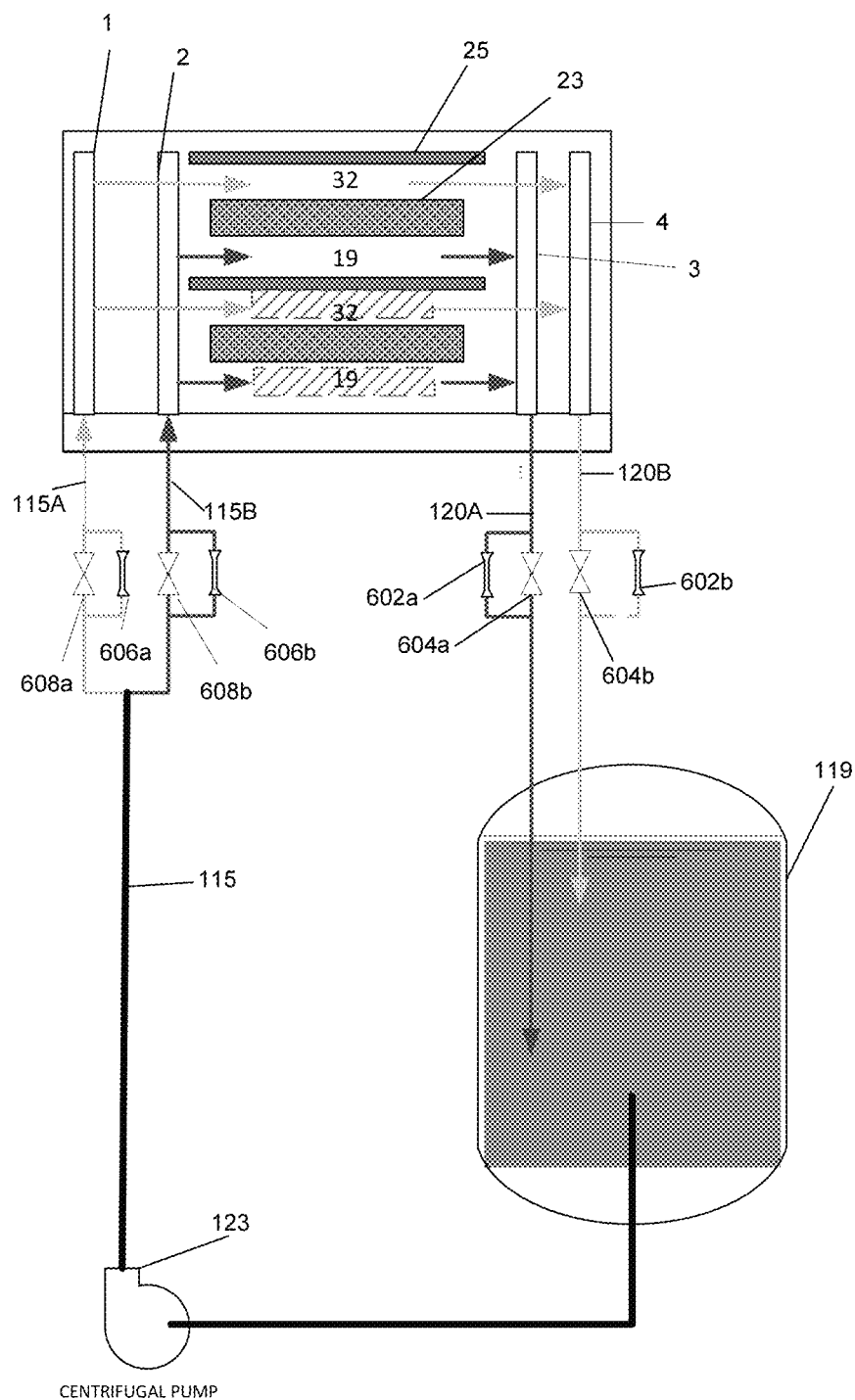
FIG. 6B illustrates a schematic side cross sectional view of flow paths in an alternative embodiment electrochemical system.

In another alternative embodiment, shown in FIG. 6B, conduits 120A and 120B separately provide exit flow streams to the reservoir 119, similar to the embodiment discussed above with respect to FIG. 6A. In this embodiment, however, conduits 120A and 120B may be configured with calibrated pipe restrictions 602a, 602b and on/off valves 604a, 604b, in order to control the flow ratios of the exit flow streams. Also, to control the flow ratios of the main inlet line and purge inlet line, conduits 115A and 115B may be configured with calibrated pipe restrictions 606a, 606b and on/off valves 608a, 608b. The pipe restrictions comprise a narrow pipe or orifice that has a smaller width or diameter than conduits 120A, 120B. If the majority of the flow enters the main inlet conduit 115A in all operational modes, then flow control valves 117a, 117b and restriction 606a may be eliminated to leave only the restriction 606b.

Figure 6C:
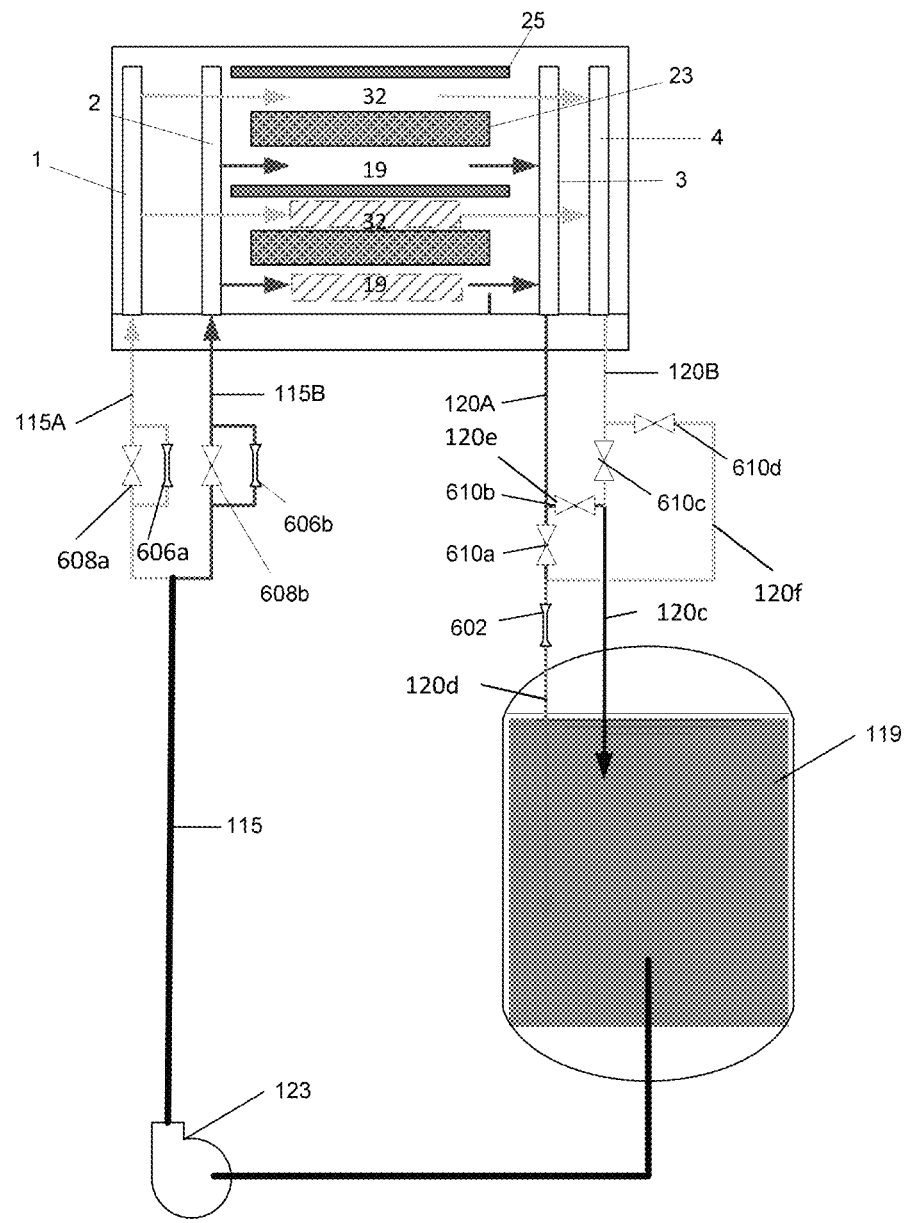
FIG. 6C illustrates a schematic side cross sectional view of flow paths in an alternative embodiment electrochemical system.

In another alternative embodiment, shown in FIG. 6C, the output conduits 120A, 120B may be fluidly connected to a majority outlet flow conduit 120c and a minority outlet flow conduit 120d. The majority of the outlet (i.e., exit) flow always flows through conduit 120c in both charge and discharge modes, while the minority of the outlet flow flows through conduit 120d in both charge and discharge modes. A calibrated pipe restriction 602 is located in conduit 120d but not in conduit 120c. On/off valves 610a, 610b, 610c and 610d may be used to steer the outlet (i.e., exit) flows from manifolds 3 and 4 through various conduits 120a-120d into the reservoir 119.

In this configuration, the exit flow return locations are differentiated by flow rate, rather than the flow path from which they originated. For example, in charge mode, the majority of the outlet flow flows from reaction zone 32, through manifold 4, into conduit 120B, while the minority of the outlet flow or no outlet flow flows from region 19 through manifold 3 into conduit 120A. In charge mode, on/off valves 610a and 610c are open and valves 610b and 610d are closed. This valve configuration forces the minority of the outlet flow to travel from region 19 through manifold 3, conduit 120A, valve 610a and through the calibrated pipe restriction 602 in conduit 120d to the reservoir, while the majority of the outlet flow travels from reaction zone 32 through manifold 4, conduit 120B, valve 610c and conduit 120c into the reservoir.

In the discharge mode, the valve configuration is reversed, on/off valves 610a and 610c are closed and valves 610b and 610d are open. This valve configuration forces the minority of the outlet flow to travel from the reaction zone 32 through manifold 4, conduit 120B, valve 610d, bypass conduit 120f and through the calibrated pipe restriction 602 in conduit 120d to the reservoir, while the majority of the outlet flow travels from region 19 through manifold 3, conduit 120A, valve 610b, bypass conduit 120e and conduit 120c into the reservoir. Thus, in both modes, the majority of the flow bypasses the restriction 602 while the minority of the flow flows through the restriction.

While four on/off valves are illustrated in FIG. 6C, multi-way valve(s) may be used instead to direct the flows between conduits 120A, 120B and conduits 102C and 120D. This arrangement of FIG. 6C may be preferable if there is a device downstream of the stack that operates best under specific flow conditions.

Figure 6D:
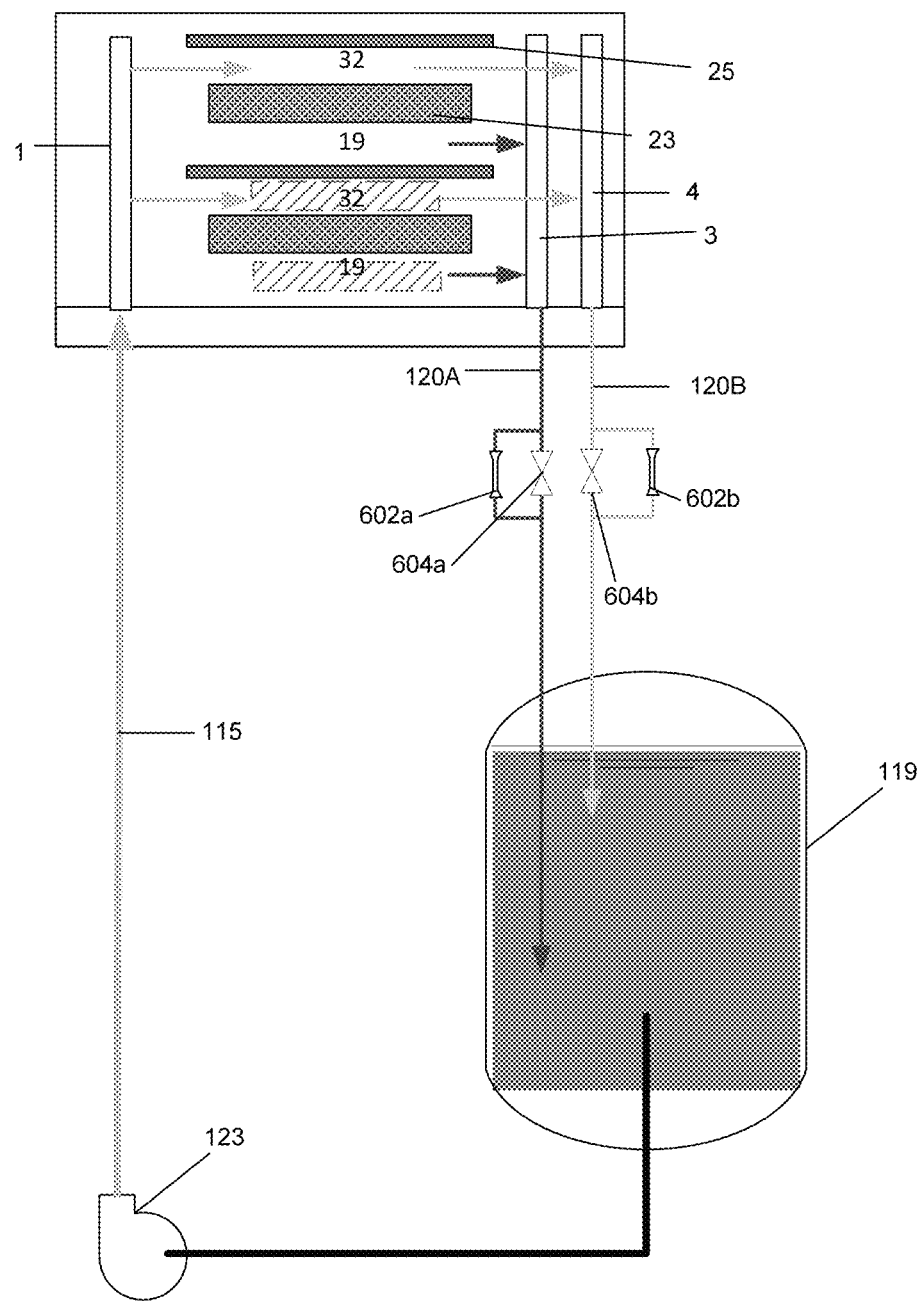
FIG. 6D illustrates a schematic side cross sectional view of flow paths in an alternative embodiment electrochemical system.
Figure 6E:
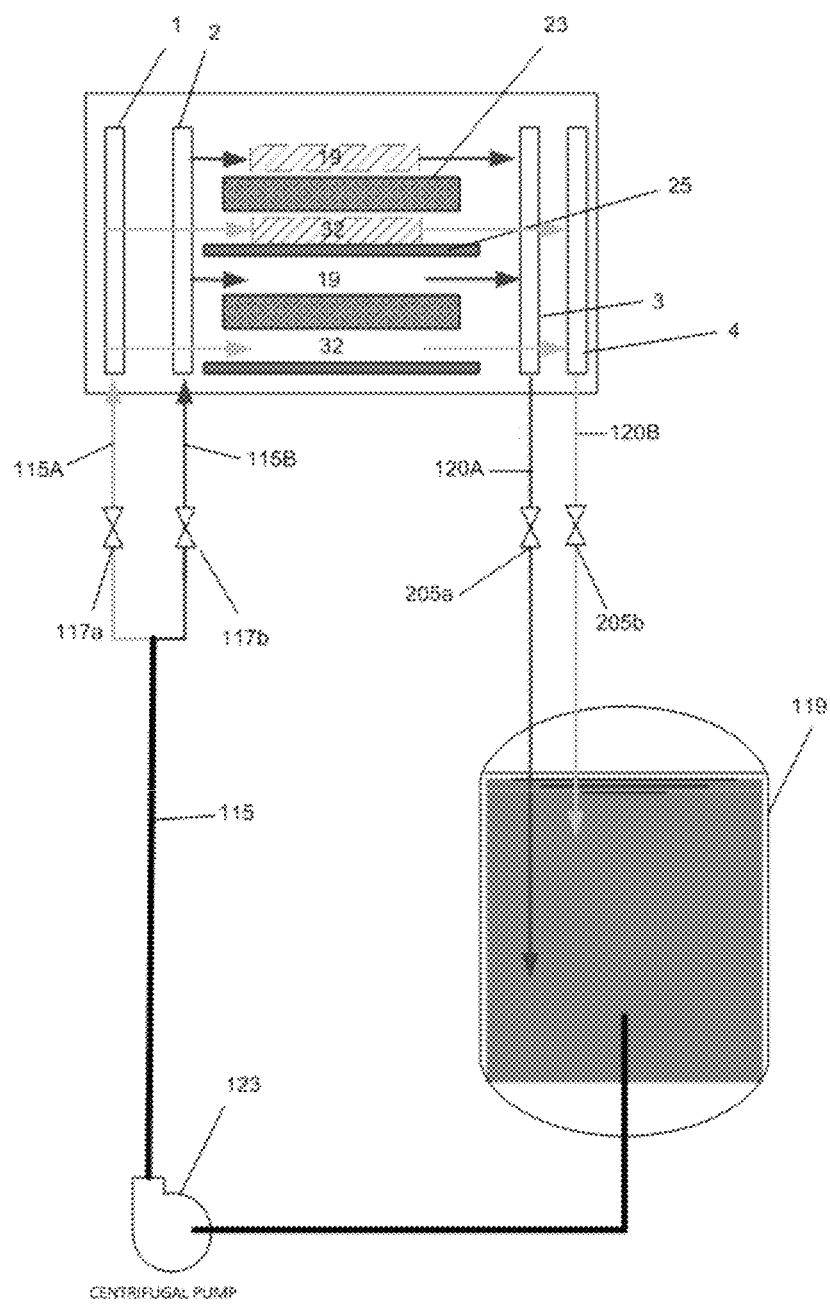
FIG. 6E illustrates a schematic side cross sectional view of flow paths in an alternative embodiment electrochemical system.
Figure 6F:
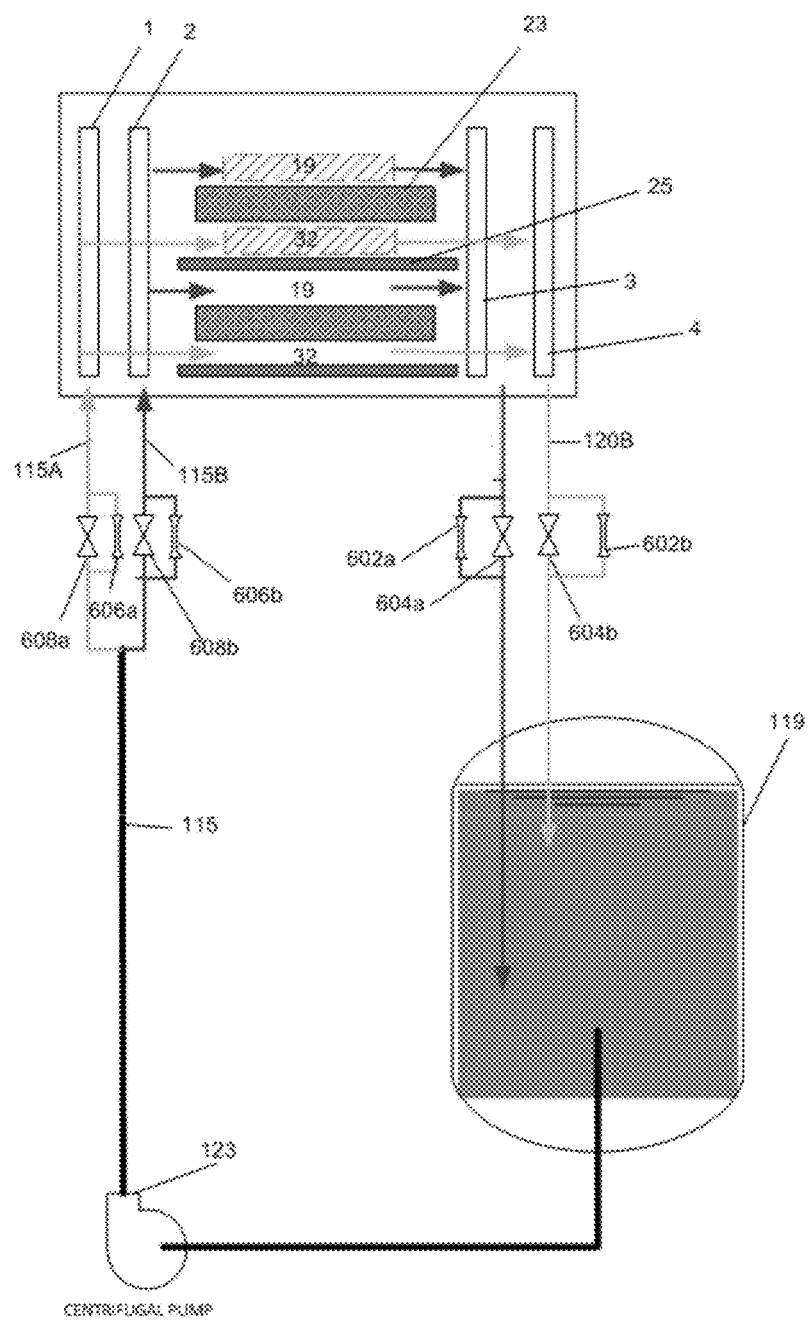
FIG. 6F illustrates a schematic side cross sectional view of flow paths in an alternative embodiment electrochemical system.
Figure 6G:
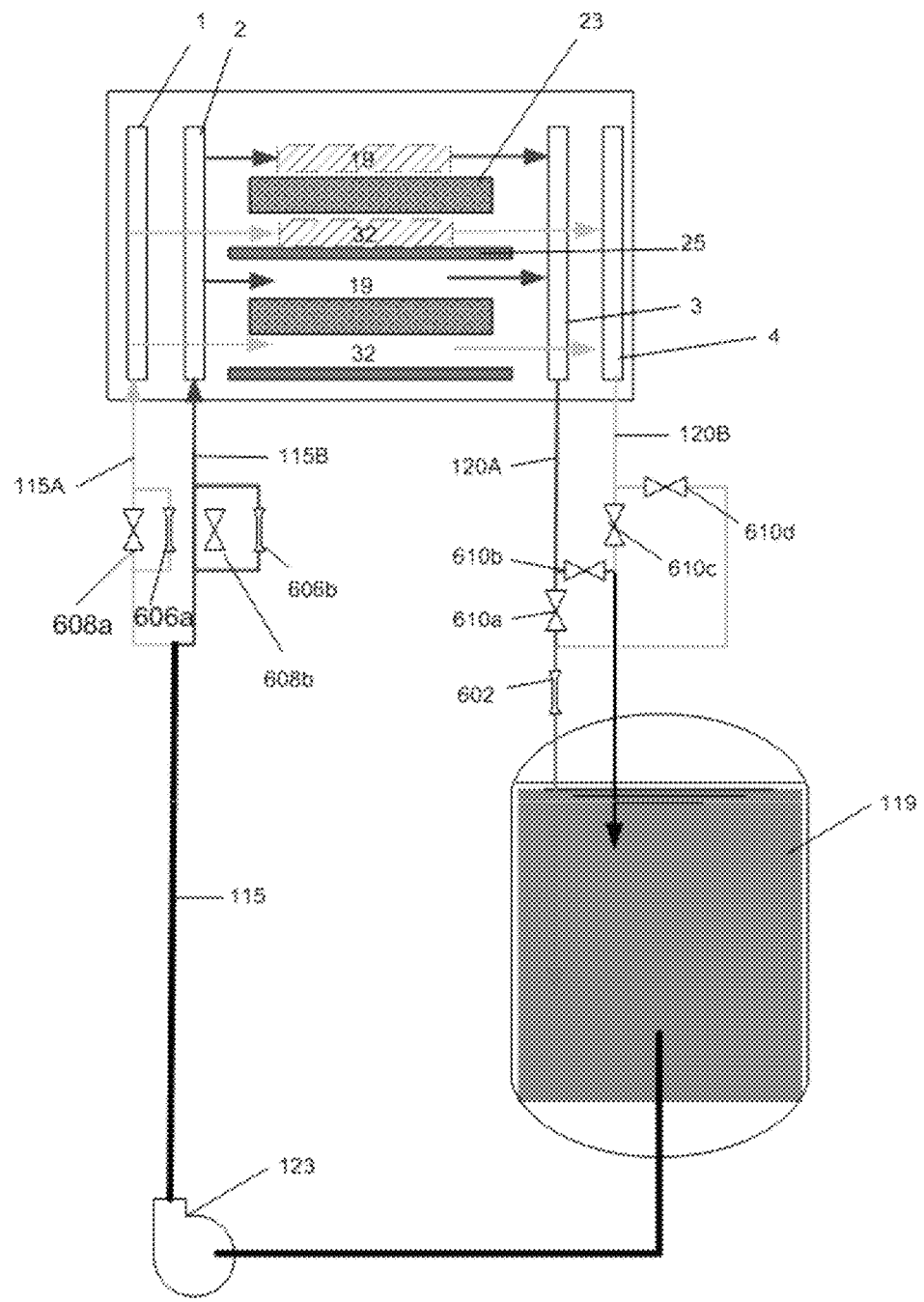
FIG. 6G illustrates a schematic side cross sectional view of flow paths in an alternative embodiment electrochemical system.
Figure 6H:
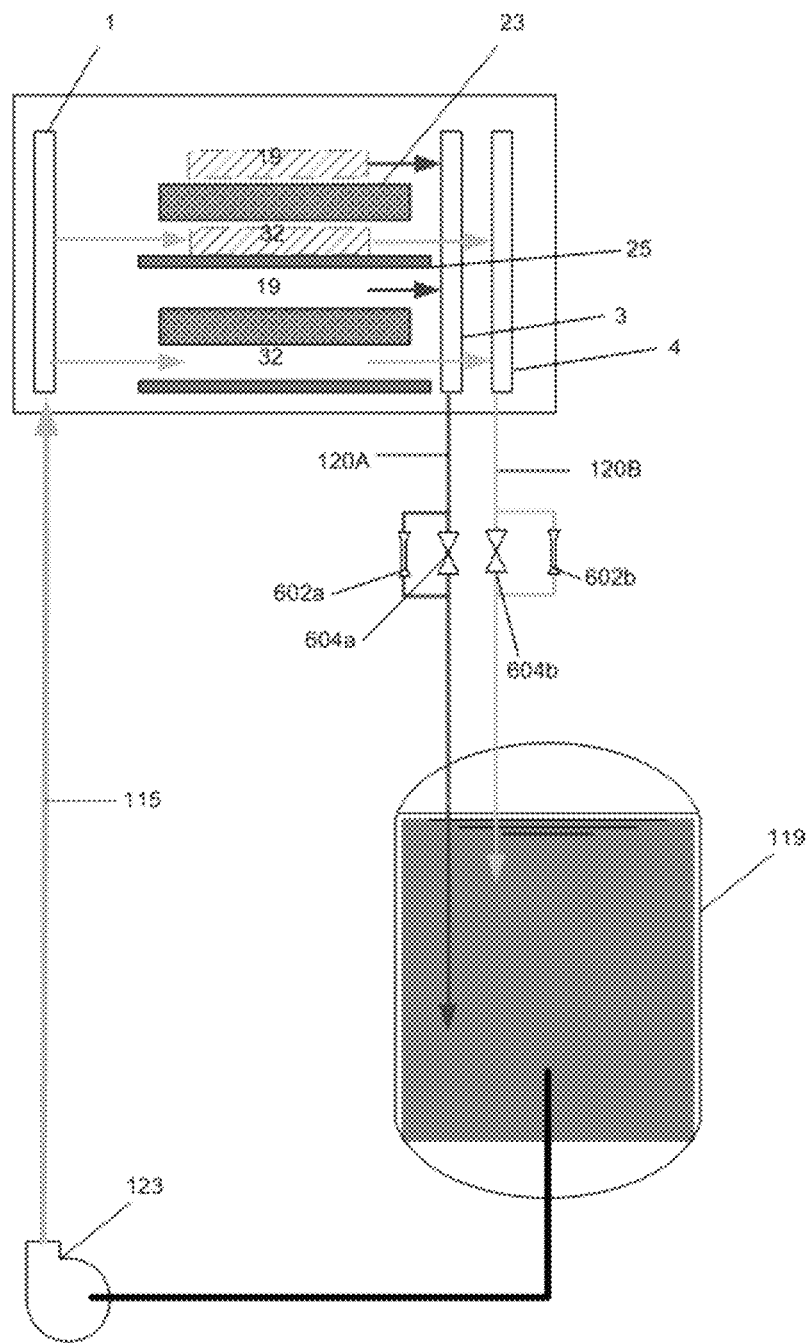
FIG. 6H illustrates a schematic side cross sectional view of flow paths in an alternative embodiment electrochemical system.

In another alternative embodiment, shown in FIG. 6D, the main inlet is provided by conduit 115, through which electrolyte may flow from the reservoir 119 to the manifold 1. In contrast to other embodiments discussed herein, no purge inlet or inlet flow control valve is provided in this embodiment configuration. Thus, conduit 115B and manifold 2 are omitted in this embodiment and there is only one common inlet conduit 115 and inlet manifold 1 for both charge and discharge modes. Conduits 120A and 120B may be configured with calibrated pipe restrictions 602a, 602b and on/off valves 604a, 604b, in order to control the flow ratios of the exit flow streams, similar to the embodiment described above with respect to FIG. 6B. Valve 604a is closed and valve 604b is open in charge mode. In contrast, valve 604a is open and valve 604b is closed in discharge mode. Thus, fixed restriction should be sufficient to control the amount of flow going into each outlet path, in which allows the use of pair of cheaper on/off valves rather than a more costly flow control valve.

FIGS. 6E-6H schematically illustrate alternative embodiments corresponding to the embodiments shown in FIGS. 6A-6D, respectively. In each of FIGS. 6E-6H, the upper electrode in each cell is a permeable electrode 23, and the lower electrode in each cell is an impermeable electrode 25, whereas FIGS. 6A-6D show the opposite electrode configuration. In contrast to the Zn plating in FIGS. 6A-6D, which occurs on the bottom face of impermeable electrode 25 against gravity, in FIGS. 6E-6H, the plating of Zn occurs on the top face of impermeable electrode 25. All other features in FIGS. 6E-6H are similar to FIGS. 6A-6D. Of course the alternative electrode configuration described above for FIGS. 6E-6H may also be used in the system shown in FIG. 6A.

Figure 6I:
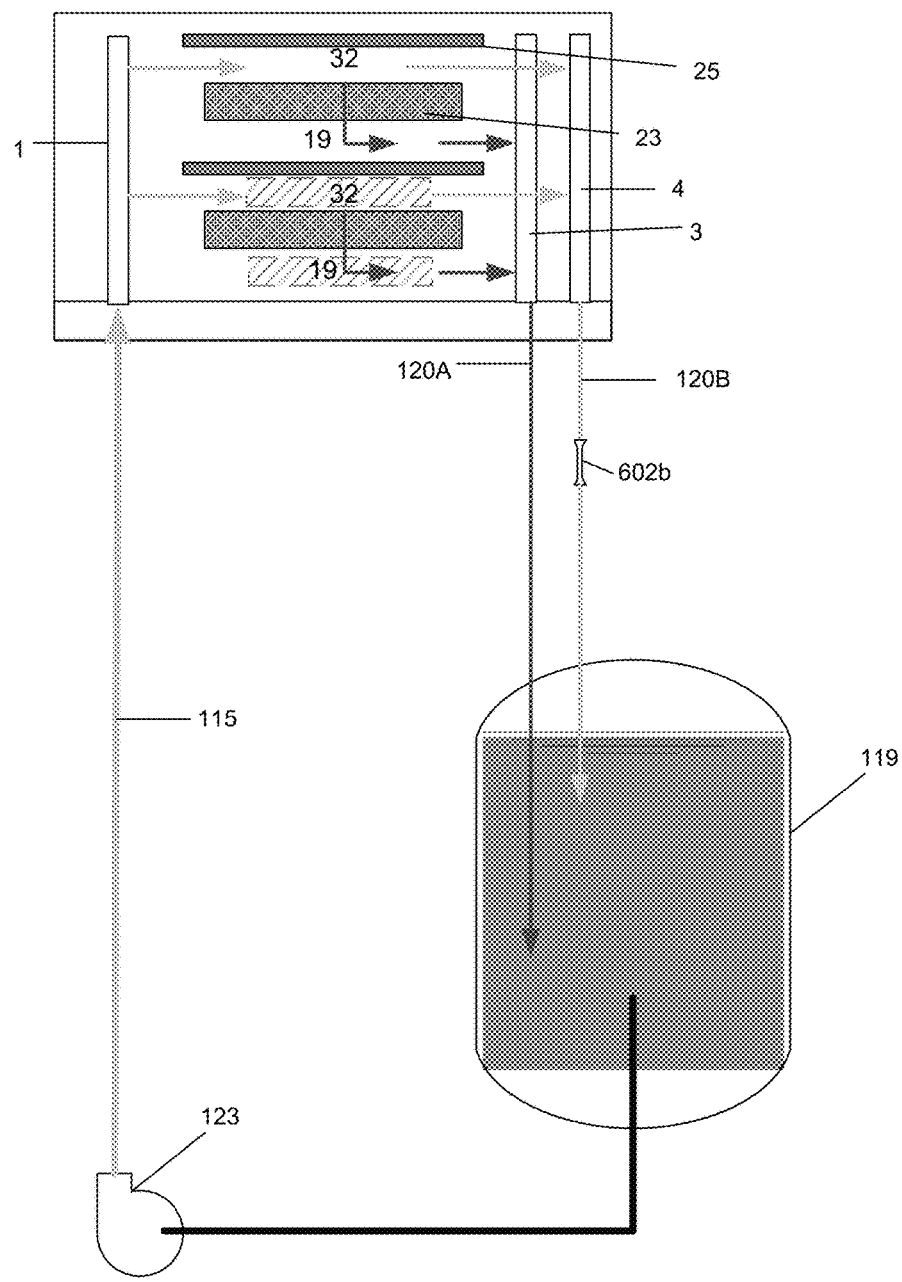
FIG. 6I illustrates a schematic side cross sectional view of flow paths in an alternative embodiment electrochemical system.

Referring back to the alternative flow paths for a flow of metal-halide electrolyte and the halogen reactant through the horizontally positioned cells of a stack, FIG. 6I schematically illustrates another alternative embodiment. Similar to FIG. 6D, the main inlet is provided by conduit 115, through which electrolyte may flow from the reservoir 119 to the manifold 1. Thus, in this embodiment of FIG. 6I there is one common inlet conduit 115 and inlet manifold 1 for both charge and discharge modes. In contrast to the embodiment illustrated in FIG. 6D, no outlet on/off valves are provided for conduits 120A and 120B in this embodiment. Conduit 120B may be configured with a calibrated pipe restriction 602b in order to control the flow ratio of the flow streams between conduits 120A and 120B. Preferably conduit 120A lacks the restriction. By placing the calibrated flow restriction 602b in conduit 120B, fluid dynamics may force a majority of fluid flow (e.g., 80%) from reaction zone 32 through the porous electrode 23 and region 19 to manifold 3 and conduit 120A in both the charge and discharge modes. At the same time, a minority of the fluid flow (e.g., 20%) may exit from reaction zone 32 through manifold 4 and conduit 120B without flowing through the porous electrode 23. The fixed restriction should be sufficient to control the amount of flow into each outlet path, thus allowing for a simpler and more reliable system by having fewer valves and having cell geometry optimized for one flow condition.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:
1. A flow battery system, comprising:
 a stack of flow battery cells that do not contain a separator in reaction zones formed between anode and cathode electrodes of each flow battery cell;
 a reservoir connected to the reaction zones of the stack; and
 a liquid electrolyte disposed in the reservoir, the electrolyte comprising an aqueous phase comprising:
  at least one metal halide;
  at least one halogen;
  an anti-dendrite agent comprising bisphenol A alkoxylate (BPA);
  a metal plating enhancer comprising a bismuth salt.
2. The system of claim 1, wherein the bismuth salt is bismuth oxide.
3. The system of claim 1, wherein the halogen is bromine and wherein the electrolyte further comprises an ionic phase comprising a bromine sequestering agent.
4. The system of claim 3, wherein:
 the metal of the metal halide is zinc;
 the halide of the metal halide is bromine or chlorine and bromine; and
 the sequestering agent is at least one of a morpholinium, pyrrolidinium, imidazolium, picolinium, pyridinium, or ammonium bromide salt (QBr).
5. The system of claim 4, wherein the sequestering agent is at least one of 1-dodecyl-1-methylmorpholinium bromide, 1-dodecyl-1-methylpyrrolidinium bromide, 1-dodecylpyridinium bromide, dodecyltrimethylammonium bromide, benzyldodecyldimethylammonium bromide, tetrabutylammonium bromide, 1-ethyl-1-methylpyrrolidinium bromide (MEP), and 1-ethyl-1-methyl-morpholinium bromide (MEM).
6. The system of claim 3, wherein the aqueous phase comprises of about 0.1-68% (w/v) zinc bromide.
7. The system of claim 6, wherein the aqueous phase further comprises about 0-30% (w/v) zinc chloride.
8. The system of claim 1, wherein the electrolyte further comprises an anti-corrosion agent.
9. The system of claim 8, wherein the anti-corrosion agent is a poly(oxy ether) having a molecular weight of at least 4000 Daltons.
10. The system of claim 8, wherein:
 the at least one metal halide comprises zinc bromide and zinc chloride;
 the at least one halogen comprises bromine; and
 the anti-corrosion agent comprises poly(ethylene oxide) (PEG) having a molecular weight of at least 4000 Daltons.
11. The system of claim 10, wherein the chelating agent comprises ethylenediaminetetraacetic acid (EDTA) or derivatives thereof.
12. The system of claim 10, wherein the bismuth salt is at least one of bismuth oxide, bismuth chloride, and bismuth citrate.
13. The system of claim 1, wherein the electrolyte further comprises a chelating agent.
14. The system of claim 13, wherein the chelating agent is an aminopolycarboxylic acid.
15. The system of claim 1, wherein the stack of flow battery cells is located in a cell chamber separate from the reservoir, and wherein the cell chamber is fluidly connected to the reservoir by a plurality of electrolyte conduits.
16. The system of claim 15, wherein:
 the system contains only the single electrolyte reservoir;
 the halogen comprises bromine;
 the flow battery is a zinc-bromine, zinc-chlorine, or zinc-chlorine-bromine flow battery configured to use a liquid electrolyte;

the aqueous phase comprises at least one of zinc bromide, zinc chloride or a mixture of zinc chloride and zinc bromide; and the electrolyte further comprises an ionic phase comprising a bromine sequestering agent.

17. A method of operating a flow battery system, comprising circulating a liquid-metal-halide electrolyte between a reservoir and a stack of flow battery cells that do not contain a separator in reaction zones formed between anode and cathode electrodes of each flow battery cell, wherein the electrolyte comprises a metal-halide, a halogen, a metal plating enhancer comprising a bismuth salt, and an anti-dendrite agent comprising bisphenol A alkoxylate (BPA).

18. The method of claim 17, wherein the circulating comprises using at least one pump to circulate the electrolyte between a chamber housing the stack of flow battery cells and the reservoir.

19. The method of claim 17, wherein:

the system contains only the single electrolyte reservoir;

the halogen comprises bromine;

the electrolyte comprises at least one of zinc bromide, zinc chloride or a mixture of zinc chloride and zinc bromide; and the electrolyte further comprises a bromine sequestering agent.

20. The method of claim 19, wherein:

the metal plating enhancer comprises at least one of bismuth oxide, bismuth chloride, and bismuth citrate; and further comprising a chelating agent which comprises ethylenediaminetetraacetic acid (EDTA) or derivatives thereof.

* * * * *